United States Patent [19]
Devonald, III et al.

[11] Patent Number: 5,521,567
[45] Date of Patent: May 28, 1996

[54] SWITCHGEAR MODULE AND CONFIGURATIONS, AND METHOD OF FABRICATION AND ASSEMBLY THEREOF

[75] Inventors: David H. Devonald, III, Green Oaks; James A. Hansen, Morton Grove; Henry W. Kowalyshen, Niles; Chester H. Lin, Lincolnwood; Buddy B. McGlone, Lombard; James K. Niemira, Skokie; Edward J. Rogers, Chicago; Edward A. Steele, Gurnee, all of Ill.

[73] Assignee: S&C Electric Company, Chicago, Ill.

[21] Appl. No.: 225,218

[22] Filed: Apr. 8, 1994

[51] Int. Cl.$^6$ .................................................. H01H 67/02
[52] U.S. Cl. .......................................... 335/132; 361/600
[58] Field of Search .................................... 335/132, 202; 361/610, 611, 612, 624, 608, 605

[56] References Cited

U.S. PATENT DOCUMENTS

| | | | |
|---|---|---|---|
| 2,424,345 | 7/1947 | West | 361/324 |
| 3,597,527 | 8/1971 | Lusk . | |
| 4,484,046 | 11/1984 | Neuhouser . | |
| 5,241,290 | 8/1993 | Sehmer et al. | 355/202 |
| 5,257,161 | 10/1993 | Ocerin . | |
| 5,373,415 | 12/1994 | Tawaratani | 361/612 |

OTHER PUBLICATIONS

Square D Bulletin SY-9T (Sep./86) "VISI VAC Pad Mounted Switchgear".
ABB Publication N-H5194E "Type tested metal-enclosed . . .".
G&W Catalog CA2-88, Mar. 1988 "Today's universal solution for making ends meet".

Primary Examiner—Lincoln Donovan
Attorney, Agent, or Firm—James V. Lapacek

[57] ABSTRACT

A switchgear module is provided that is assembled from one or more molded housing portions to provide a gas-tight volume for the housing of electrical components. The switchgear modules include provisions for assembly of various combinations of switchgear modules into a variety of electrical circuit configurations while maintaining a gas seal of the switchgear modules. In a preferred arrangement, the switchgear module includes bus conductors that are integrally incorporated during the molding of the switchgear module housing and that are accessible from opposite sides of the module. Further, the switchgear module includes integrally molded features for providing access to make electrical interconnections between the bus conductors of adjacently positioned switchgear modules. Thus, the finally assembled and tested switchgear modules with pressurized internal volume may be configured to provide a variety of different electrical circuit combinations of the internal components and are also capable of being reconfigured as desired into different configurations or lineups without the loss of the seal of the interior volume of the switchgear modules. The switchgear module includes a complete internal and integral system to satisfy desirable operating practices to deenergize, test and ground the circuit before working thereon. Specifically, the switchgear module includes an integral indicator with test feature, a visible open gap in the circuit which is readily observable externally to the module, and a ground position for the internal switch to ground the circuit. In a preferred arrangement, an operating mechanism is internal to the module and controls the position of either a loadbreak switch or a disconnect switch between three operable positions, close, open, and ground. The operating mechanism is charged and operated by an operating train that is connected to an operator control.

33 Claims, 22 Drawing Sheets

SWITCHGEAR MODULE AND CONFIGURATIONS, AND METHOD OF FABRICATION AND ASSEMBLY THEREOF

BACKGROUND OF THE INVENTION

1. Field of the Invention

The present invention relates generally to switchgear modules and configurations thereof for the field of electrical power distribution and the method of fabrication and assembly thereof, and more particularly to switchgear modules having improved bus interconnection features and integrally provided features that are formed during molding of the switchgear module and portions thereof.

2. Description of the Related Art

Switchgear are generally categorized by their installation location (e.g. grade or surface, sub-surface etc.), the configuration of components (e.g. loadbreak switches, fuses, interrupters, disconnects, sectionalizers, etc.), the cable connections (e.g. elbows, cable terminators), the accessibility of components, the medium within the switchgear enclosure, for example air, vacuum, oil, gas (such as $SF_6$), etc., and additional features such as fault indicators, voltage indicators, power operation, automatic fault interruption control, etc. For example, switchgear that incorporate the combination of a vacuum interrupter with a series connected visible disconnect is disclosed in U.S. Pat. 4,484,046 and illustrated in the Square D Bulletin SY-9T (Sep. 1986). In the arrangement of the aforementioned U.S. Pat. No. 4,484,046, the visible disconnect is also connected to a ground when moved to the opened position. Another arrangement, Type RGC switchgear available from ABB and illustrated in Catalog publication N-H 5194 E, utilizes a loadbreak switch and series connected disconnect that is visible and connected to ground in an open position, the loadbreak switch and the disconnect being disposed in an $SF_6$ environment.

The termination of power cables and the connection of bus structures is also an important aspect of switchgear and its use. An example of a cable connection arrangement that utilizes a junction pad as part of a module that terminates a cable is shown in U.S. Pat. No. 3,597,527. In this arrangement, one module is used to terminate each cable and cable joints or splices are formed by a connecting bolt placed through the aligned junction pads which are biased together, the termination then being completed by the affixing of gaskets and end plates over the exteriors of the junction pads. This arrangement is also shown in G&W Electric Co. Catalog CA2-88 (Mar. 1988). An example of connections between switchgear modules or transformer units is shown in U.S. Pat. No. 5,257,161 including cover guards and conductive tabs on contactors within the cover guards that are provided from each sealed housing, and an insulating mount that is inserted into two facing cover guards of two adjacent switchgear modules, the insulating mount being provided with conductive parts that are shaped and include resiliency so as to form connections with the conductive tabs when assembled between adjacent switchgear modules.

While the prior art arrangements may be useful to provide switchgear of various configurations, the prior arrangements are rather complicated regarding assembly and limited regarding installation and configuration into different arrangements.

SUMMARY OF THE INVENTION

Accordingly, it is a principal object of the present invention to provide a switchgear module having one or more molded housing portions which are easily assembled to provide a switchgear module and which include integrally provided features for the support and mounting of components and bus conductors.

It is another object of the present invention to provide switchgear modules that house components in a volume of pressurized insulating gas and which are capable of being configured by assembly into a variety of electrical circuit configurations and reconfigured as desired without the loss of the gas seal of the modules.

It is a further object of the present invention to provide switchgear modules that are capable of assembly into a variety of desirable configurations for diverse mounting and installation location and that include provisions for interconnection of the bus conductors of the switchgear modules to form the configurations.

It is yet another object of the present invention to provide a switchgear module that integrally incorporates a voltage indicator with test feature, an observable visible gap for establishing isolation and the deenergized conditions, and an internal ground position such that suitable working clearances may be established for working around the switchgear module and attached conductors.

It is a still further object of the present invention to provide switchgear modules that provide gas-tight integrally molded bus conductors and provisions for accessing the bus conductors externally of the module and integrally formed interconnection provisions for the bus conductors of adjacent switchgear modules.

These and other objects of the present invention are efficiently achieved by the provision of a switchgear module that is assembled from one or more molded housing portions to provide a gas-tight volume for the housing of electrical components. The switchgear modules include provisions for assembly of various combinations of switchgear modules into a variety of electrical circuit configurations while maintaining a gas seal of the switchgear modules. In a preferred arrangement, the switchgear module includes bus conductors that are integrally incorporated during the molding of the switchgear module housing and that are accessible from opposite sides of the module. Further, the switchgear module includes integrally molded features for providing access to make electrical interconnections between the bus conductors of adjacently positioned switchgear modules. Thus, the finally assembled and tested switchgear modules with pressurized internal volume may be configured to provide a variety of different electrical circuit combinations of the internal components and are also capable of being reconfigured as desired into different configurations or lineups without the loss of the seal of the interior volume of the switchgear modules. For example, one type of switchgear module includes a loadbreak switch and a second type of switchgear module includes the series combination of a disconnect switch and a fault interrupter, such that two modules of each of the first and second types may be interconnected to provide an electrical circuit combination of two three-pole group-operated loadbreak switches each with a separate three-phase source connected to supply, via a common three-phase bus, two sets of three-phase fault interrupters with individually operable single-phase disconnect switches. The switchgear module includes a complete internal and integral system to satisfy desirable operating practices to deenergize, test and ground the circuit before working thereon. Specifically, the switchgear module includes an integral indicator with test feature, a visible open gap in the circuit which is readily observable externally to the module, and a ground position for the internal switch to ground the circuit. In a preferred arrangement, an operating mechanism is internal to the module and controls the position of either a loadbreak switch or a disconnect switch between three operable positions, close, open, and ground. The operating mechanism is charged and operated by an operating train that is connected to an operator control.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
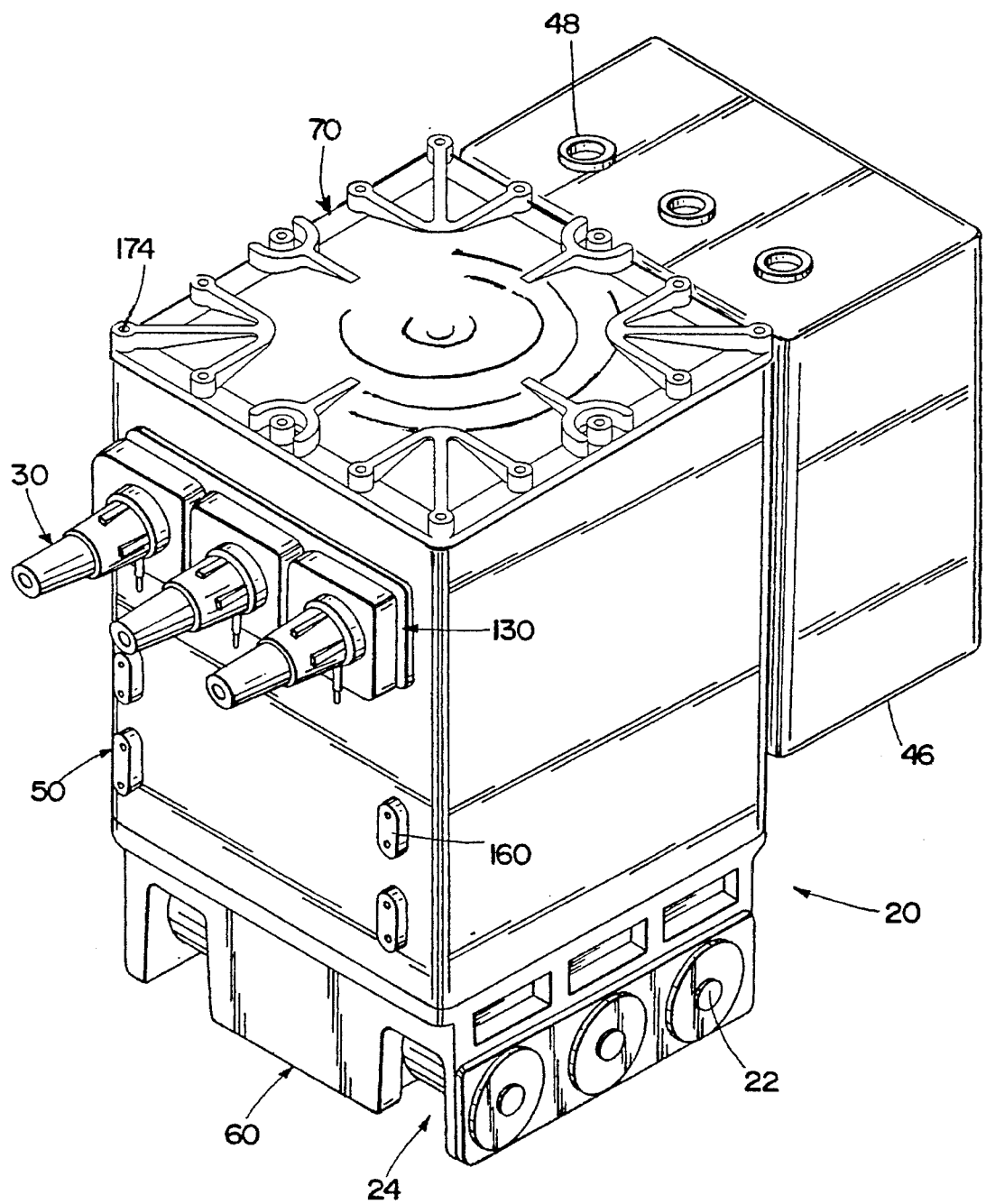
FIG. 1 is a perspective view of a switchgear module of the present invention.
Figure 2:
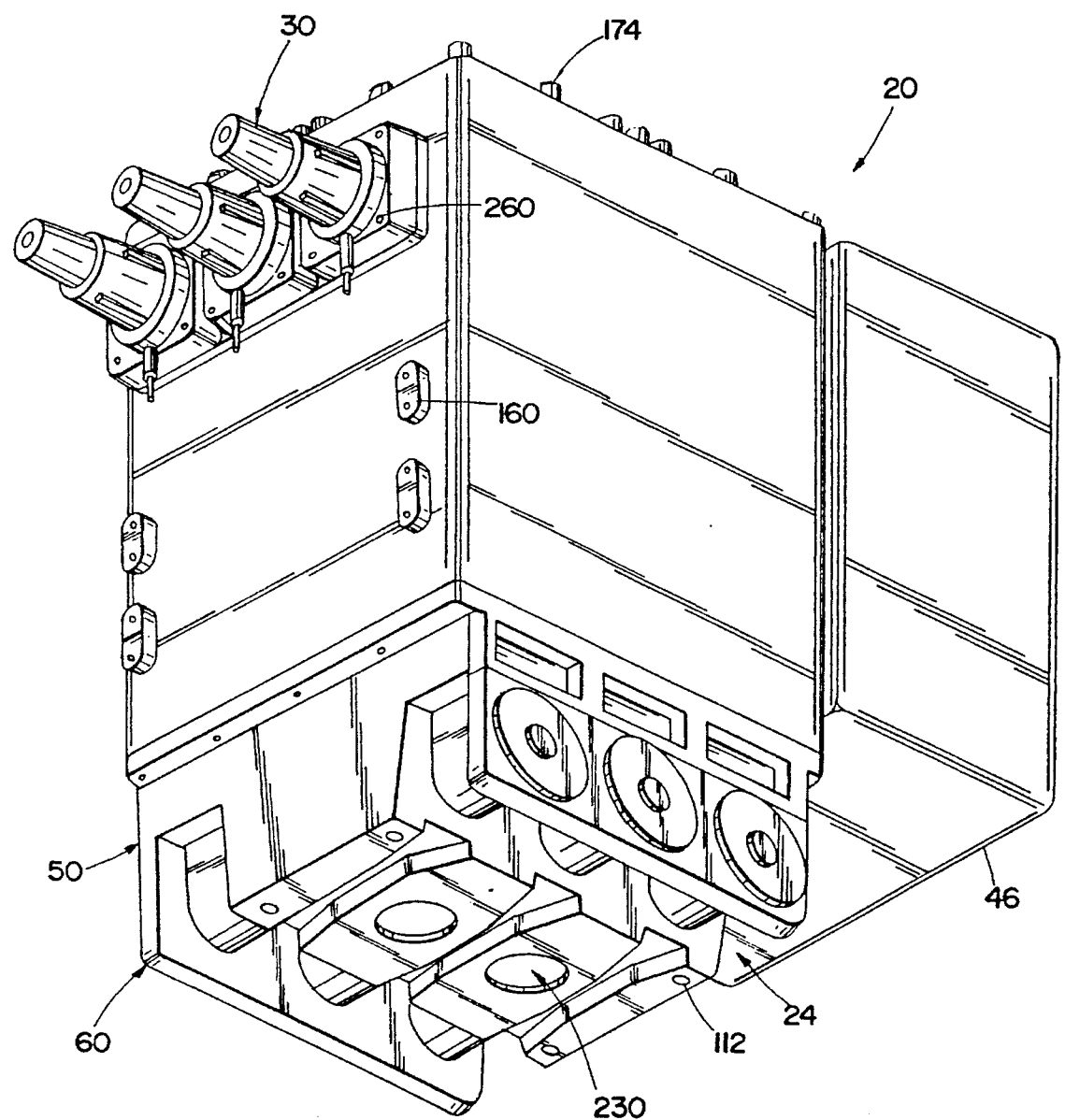
FIG. 2 is a perspective view similar to FIG. 1 and showing the bottom of the switchgear module.
Figure 3:
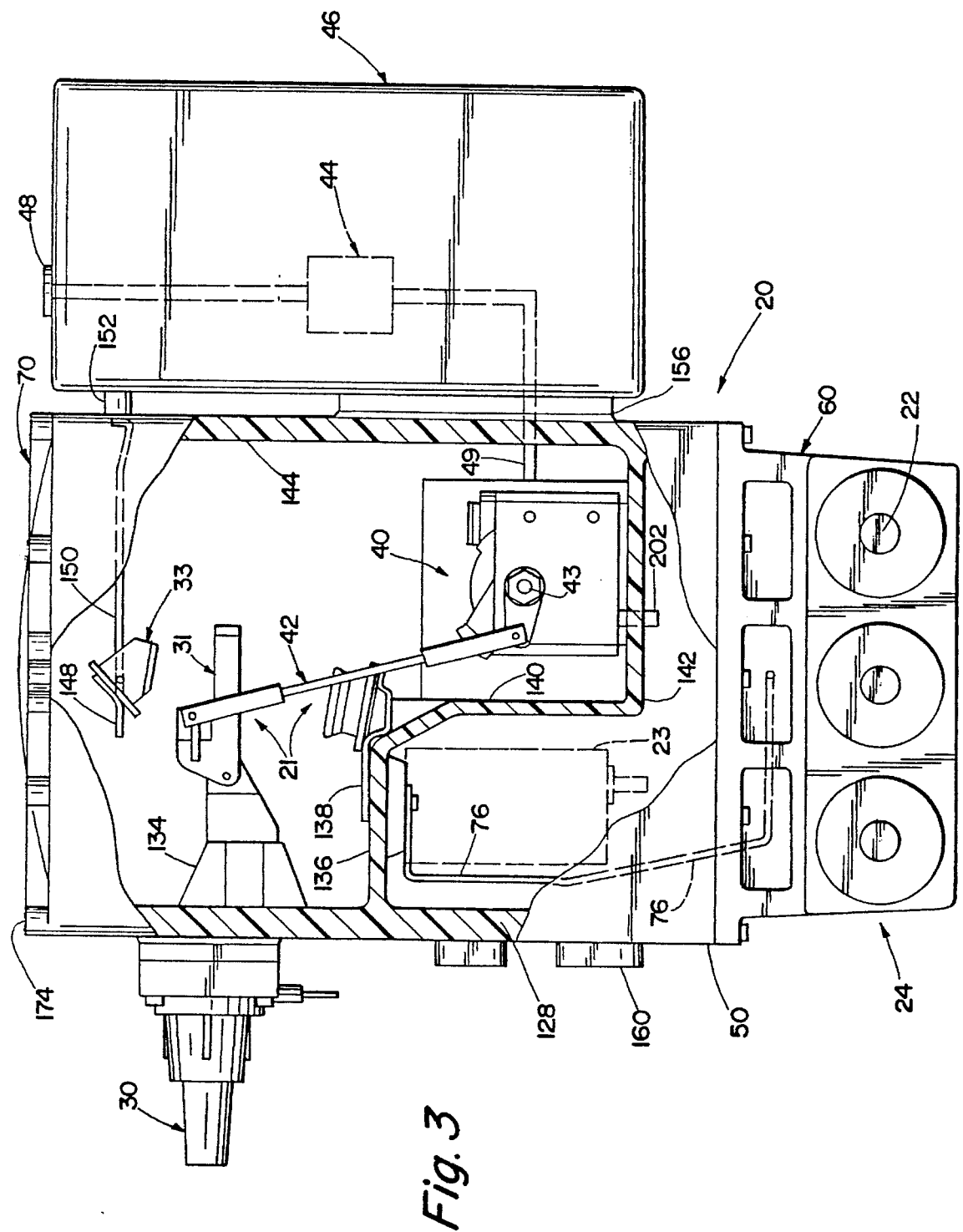
FIG. 3 is a right-side elevational view of the switchgear module of FIGS. 1 and 2 with parts cut away for clarity.
Figure 4:
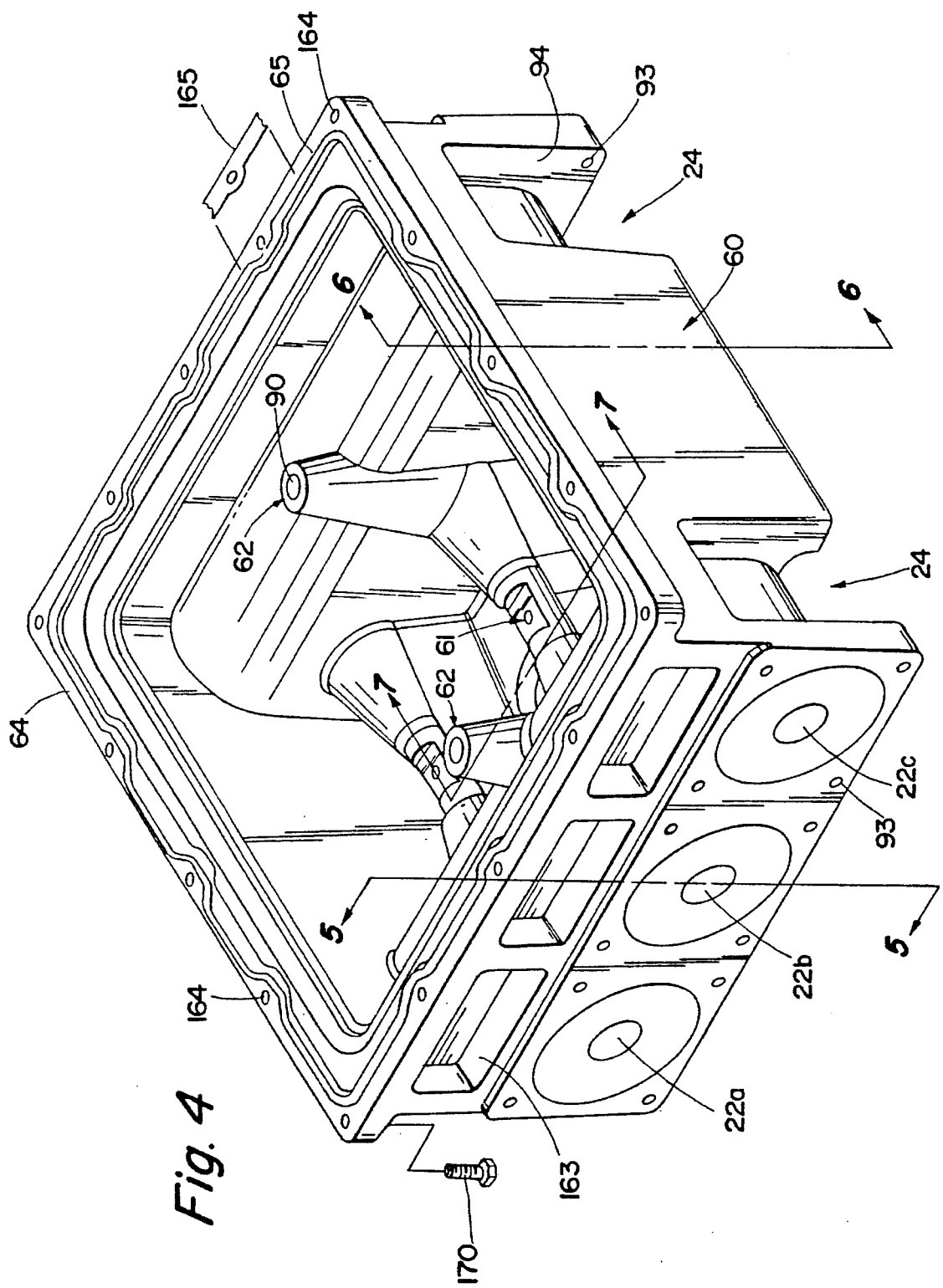
FIG. 4 is a perspective view of a base portion of the switchgear module of FIGS. 1–3.

Referring now to FIGS. 1–3, the switchgear of the present invention provides various predetermined configurations/combinations of loadbreak switches, disconnects and fault interrupters in accordance with the combination and interconnection of individual modules such as the representative illustrative module 20. In one illustrative arrangement, the module 20 includes either a loadbreak switch 21 (FIG. 3) or the combination of a fault interrupter 23 (shown in phantom in FIG. 3) and a disconnect, the switch 21 being configured as a disconnect switch when the fault interrupter 23 is present. Each of the modules similar to the representative module 20 are capable of being interconnected to each other via main bus conductors 22 and interconnection provisions generally referred to at 24, which will be explained in more detail hereinafter. For example, and referring additionally to FIGS. 12 and 13, four switchgear modules such as 20 and designated as 25,26,27 and 28 in FIG. 12 may be interconnected as shown to form a configuration or lineup providing, for example, a typical electrical distribution configuration as illustrated in FIG. 13 including two three-pole group-operated loadbreak switches with common three-phase bus connections. The modules 20 include bushings 30 (or bushing wells) for interconnection with elbow connectors 32 (FIG. 12) terminating power distribution cables 35 (FIG. 12) to accomplish various desired circuit connections. The switchgear modules 20 are suitable for operation at distribution voltages up to either 15 kV, 25 kV or 34.5 kV in accordance with suitable dimensions, and rated for load switching in excess of 600 amperes and fault closing in excess of 12,000 amperes.

The switches 21 are operated by a mechanism 40 and drive linkage 42 interconnected between the switches 21 and the mechanism 40 via a main operating shaft 43. In a preferred arrangement, the mechanism 40 includes an operating position to drive the movable contact 31 of the loadbreak switch 21 into a ground position to contact the ground contact 33. In one illustrative arrangement, the mechanism 40 utilizes stored-energy (e.g. via a spring) to provide a quick-make, quick-break feature and is charged via an operating train generally referred to at 44 and housed within a control module 46. The operating train 44 is operated by rotation of an operating hub 48 that exits the top of the control module 46. The operating hub 48 is operable via a tool (not shown) and is arranged such that the operating hub 48 is rotatable only one position at a time, e.g. from close to open, and not directly from close to open to ground. The mechanism 40 includes an input shaft 49 that extends out the rear of the module 20 for connection to the operating train 44. In specific configurations where fault interrupters 23 are provided, the control module 46 also includes operating control arrangements for the fault interrupters 23. The features of the loadbreak switch 21 permit the switchgear module 20 to be of minimal dimensions while providing the desired features of loadbreak capability, visible open gap, ground position, fault-closing capability etc. A suitable loadbreak switch 21 is disclosed and claimed in co-pending U.S. application Ser. No. 08/225,221 U.S. Pat. No. 5,464,596 filed in the names of E. A. Steele et al on Nov. 9, 1995, to which reference may be made for a more detailed discussion and which is hereby incorporated by reference for all purposes.

Each of the switchgear modules 20 provides a sealed pressurized gas volume for housing the electrical components such as the switches 21 and the mechanism 40. The module 20 in a preferred arrangement includes a central housing portion which incorporates the electrical components and bushing connections. The central housing portion 50 is assembled to a base portion 60 that carries the main bus conductors 22 and the interconnection arrangements 24. The electrical components such as the switches 21 are connected to the bus conductors 22 in the base portion 60 as will be described in more detail hereinafter. A cover 70 (FIGS. 1,3 and 9) is affixed atop the central housing portion 50. In a preferred arrangement, the cover 70 is transparent, either entirely or at least over a substantial area for viewing the open gap and grounded positions of the switches 21 as will be explained in more detail hereinafter. After the cover 70 is assembled, the sealed module 20 can then be filled with a suitable insulating gas, such as SF6 for example, to a desired pressure.

In accordance with these features of the present invention, the modules 20 can be factory assembled as complete operational modules of various configurations of internal components, for example, fault interrupters or loadbreak switches, and then tested on an individual modular basis for function and specifications. This provides the efficiency and flexibility of interconnecting the modules 20 to provide any desired configuration so as to make the overall combination of modules or configurations ready for field installation on a nearly immediately available basis. Additionally, the modules 20 can be reconfigured or replaced on a modular basis as necessary or desired, either in the field or in suitable service centers. In accordance with the features of the present invention, the interconnection of the modules 20 into desired configurations and the reconfiguration of the modules can be accomplished while maintaining the seal and pressurization of the modules. The interconnection provisions 24 of the bus conductors 22 also provide physical attachment of the modules 20.

Figure 14:
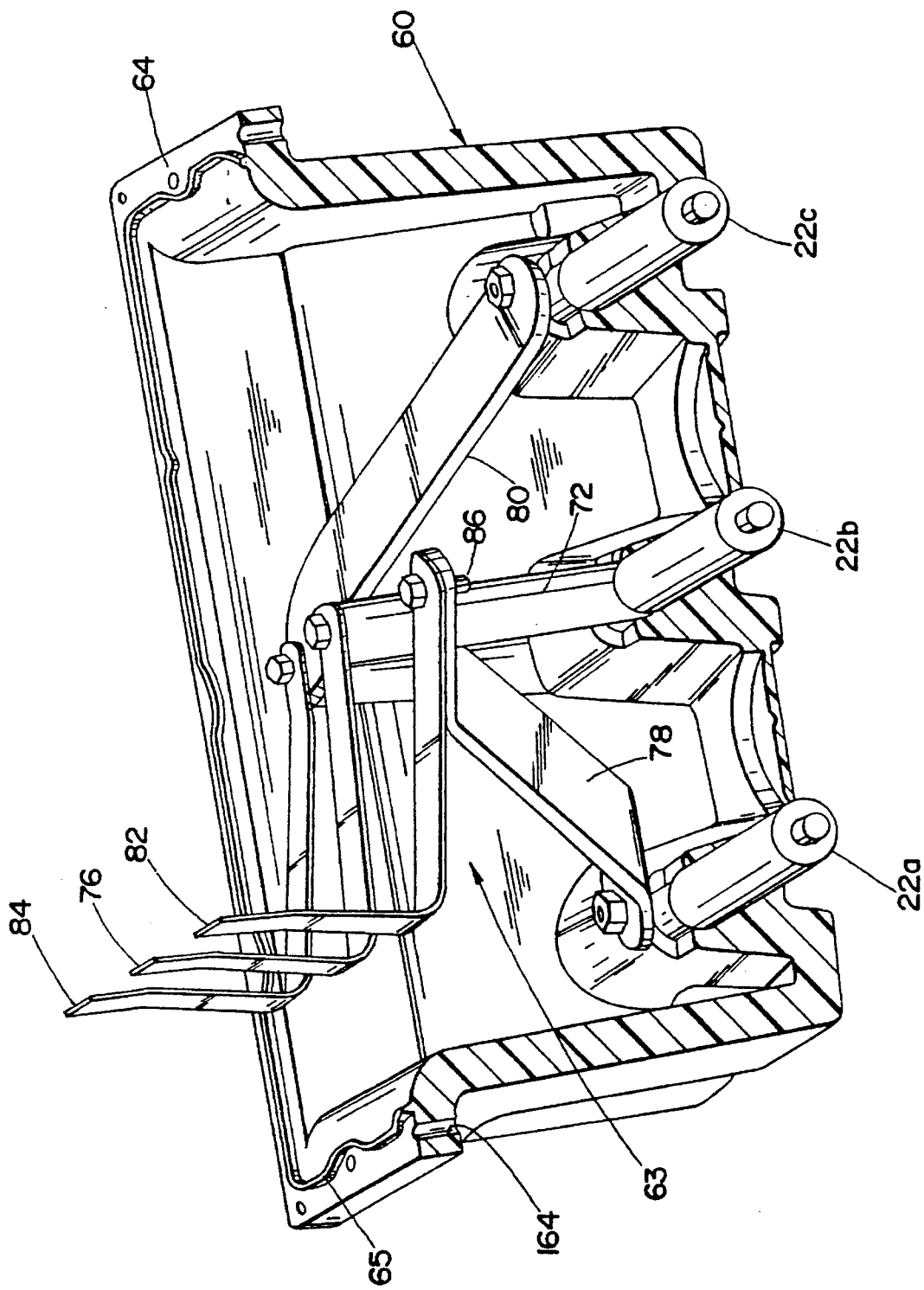
FIG. 14 is a perspective view with parts cut away of the base portion of FIGS. 4–7 and illustrating assembled component parts of a bus to phase conductor arrangement.

Referring now additionally to FIGS. 4–7 and 14 for a more detailed discussion of the base portion 60, in accordance with important aspects of the present invention, the base portion 60 is preferably fabricated in a molding operation so as to include integrally incorporated bus conductors 22a, 22b and 22c (illustrative for a three-phase system), the integrally molded interconnection provisions 24, a mounting flange 64 including (in a specific embodiment) an upstanding tongue 65 that extends around the perimeter of the upper edge of the base portion 60 for use in assembly to the central housing portion 50, and bus connection points 61 and integral supports 62 for use in supporting and connecting phase to bus conductors (for connection to the loadbreak switches 21, for example) generally referred to at 63 (FIG. 14). The bus conductors 22 (22a, 22b, and 22c) extend from one side of the base portion 60 to the other and are sized to carry the desired bus currents in the electrical power distribution system for which the module 20 is designed. The bus conductors 22 are open to the interior volume of the base portion 60 at the bus connection points 61 at which locations they are provided with attachment provisions, for example, planar interconnection surfaces 66 and a threaded passage 68 for receiving a threaded fastener or the like.

As shown in FIG. 14, the phase to bus interconnection arrangement 63 for the center bus conductor 22b includes a first conductor 72 that extends vertically from the connection point 61 and includes a threaded stud 74 for attaching the first conductor 72 to the bus conductor 22b. A conductor 76 is connected at the top end of the first conductor 72 and extends to provide a connection to the electrical components in the central housing portion 50, for example to the loadbreak switch 21 as shown in FIG. 3. When the fault interrupter 23 is provided, the conductor 76 is flexible to accommodate movement at the point of attachment to the fault interrupter 23. The phase to bus interconnection arrangement 63 includes second and third conductors 78 and 80 respectively for connection to the end bus conductors 22a and 22b respectively. The conductors 78 and 80 are each connected to the respective bus conductor at the point 61 via suitable fasteners and the threaded passages 68. The other end of each of the conductors 78,80 is connected to a respective flexible conductor 82,84 via a fastener 86. The connection of the conductors 78,80 to the flexible conductors 82,84 is supported by integral supports 62, for example by threaded sleeves 88 inserted into integrally formed passages 90 of the integral supports 62.

Figure 5:
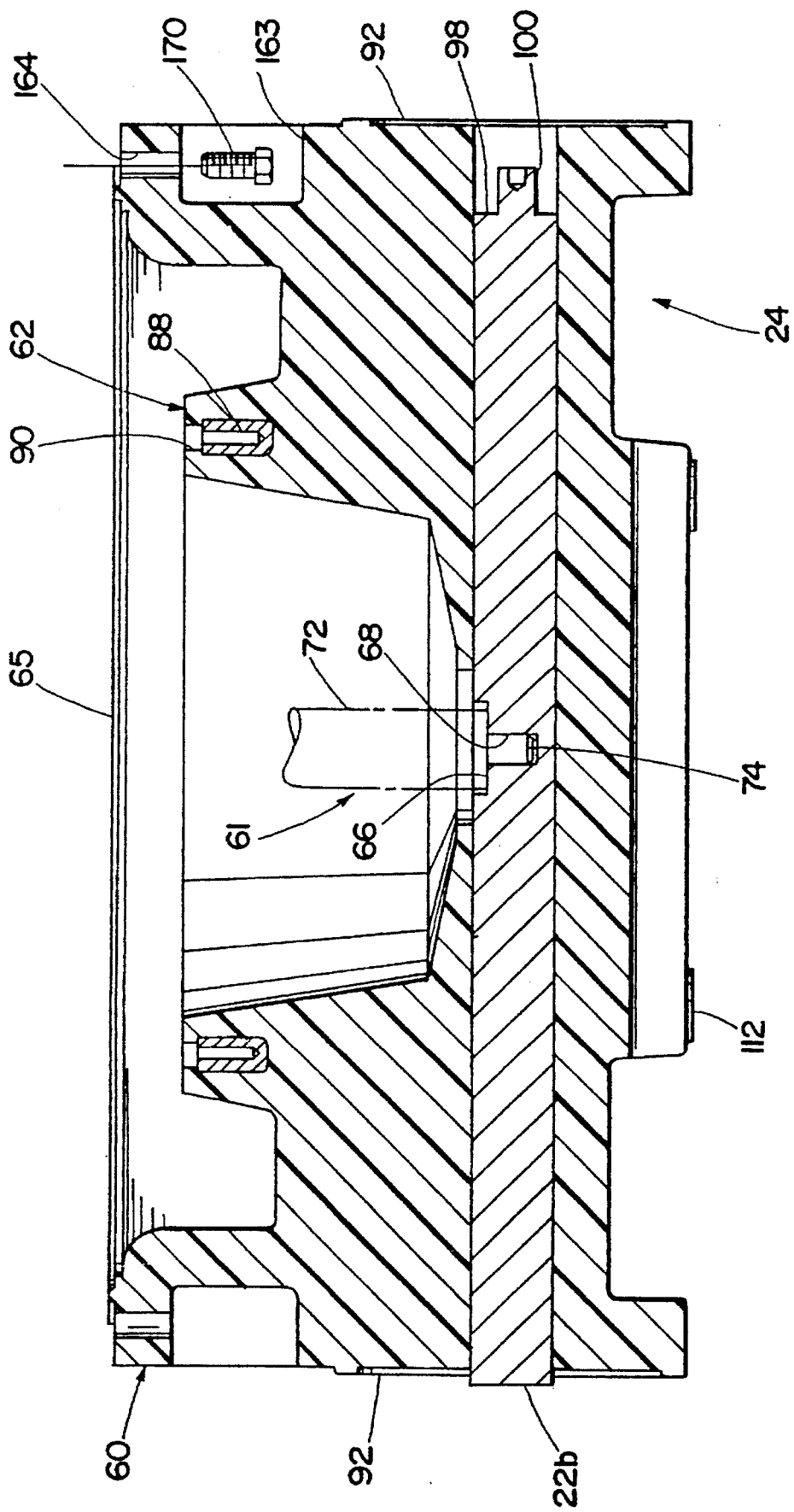
FIG. 5 is a sectional view taken from the line 5—5 of FIG. 4.

In accordance with important aspects of the present invention, the integrally molded interconnection provisions 24 include outwardly facing mounting surfaces or flanges 92 and accessible assembly flanges 94 formed around a large portion (e.g. three sides) of the perimeter of each of the bus conductors 22, the flanges being formed on inwardly facing surfaces, i.e. in a plane or surface generally parallel to the mounting flanges 92 with the accessible volumetric space being defined generally out of the volume defined by the overall dimensions of the base portion 60. Passages 93 are formed through the flanges 92 and out of flange 94 for assembly with other modules 20 to provide interconnection as will be explained in more detail hereinafter. The interconnection provisions 24 also include the bus conductors 22 being sealed with respect to the body of the base portion 60 during the molding thereof, the relative positions of the ends of the conductors 22 with respect to the outer surface of the mounting flanges 92, and the shape of the ends of the conductors 22, e.g. as shown in FIG. 5, a first end 96 of the conductor 22 (at the left in FIG. 5) having a flat face and protruding a predetermined distance beyond the outermost portion of the mounting flange 92, and the second end 98 of the conductor 22 (at the right in FIG. 5) being formed with a narrowed, extending cylindrical neck portion 100 which is positioned (during molding) so as to be a predetermined distance within the outer mounting flange 92.

Figure 12:
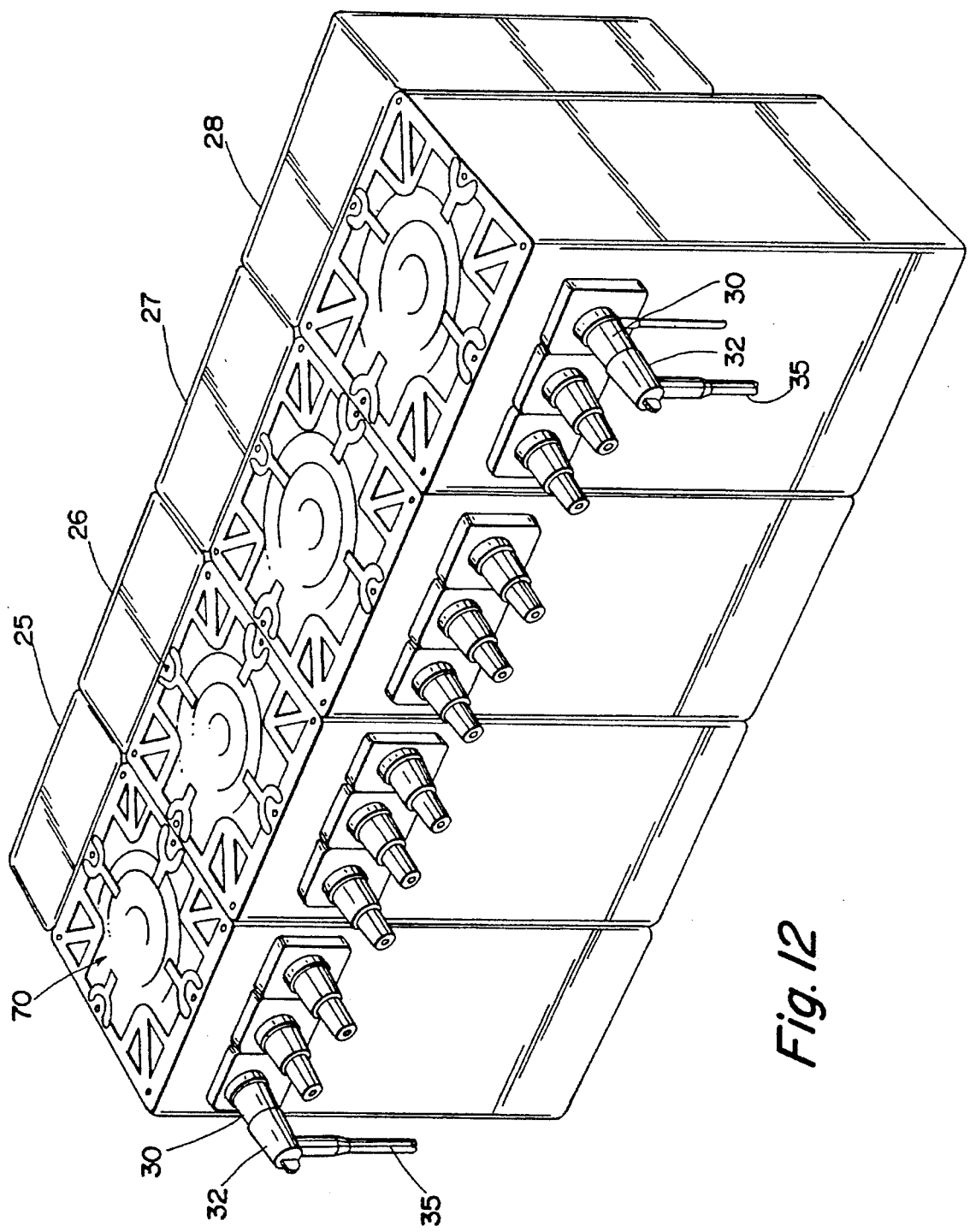
FIG. 12 is a perspective view of four switchgear modules of the type shown in FIG. 1 assembled into a predetermined configuration.
Figure 13:
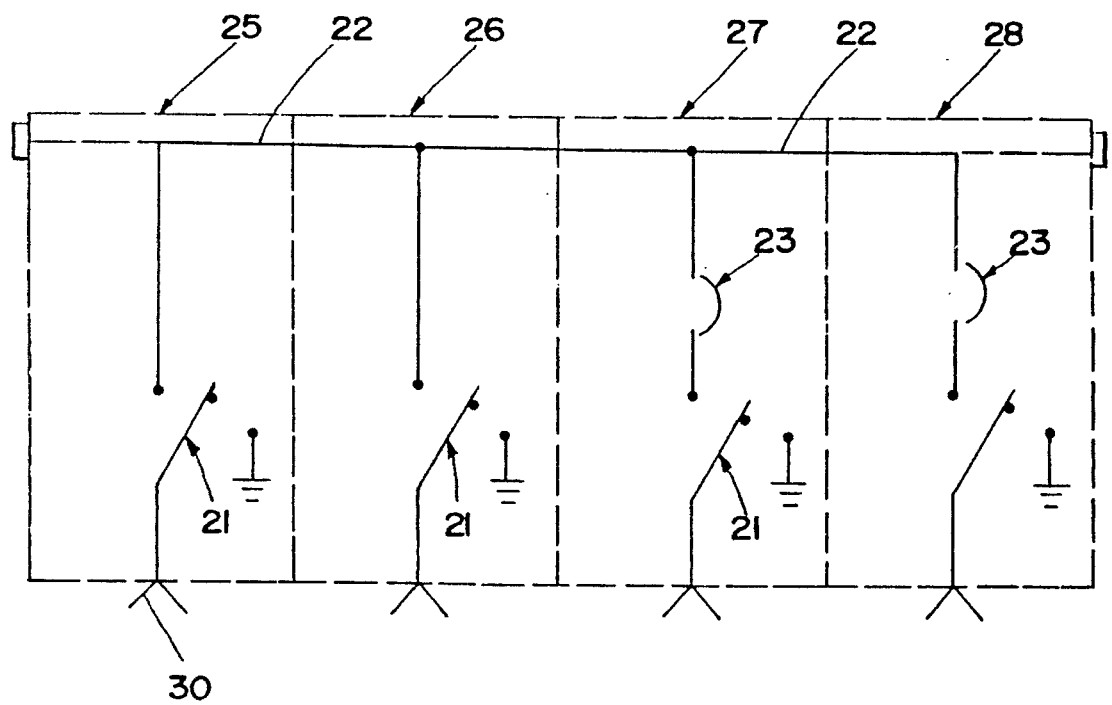
FIG. 13 is an electrical schematic and diagrammatic view of the circuit configuration provided by the arrangement of FIG. 12.
Figure 15:
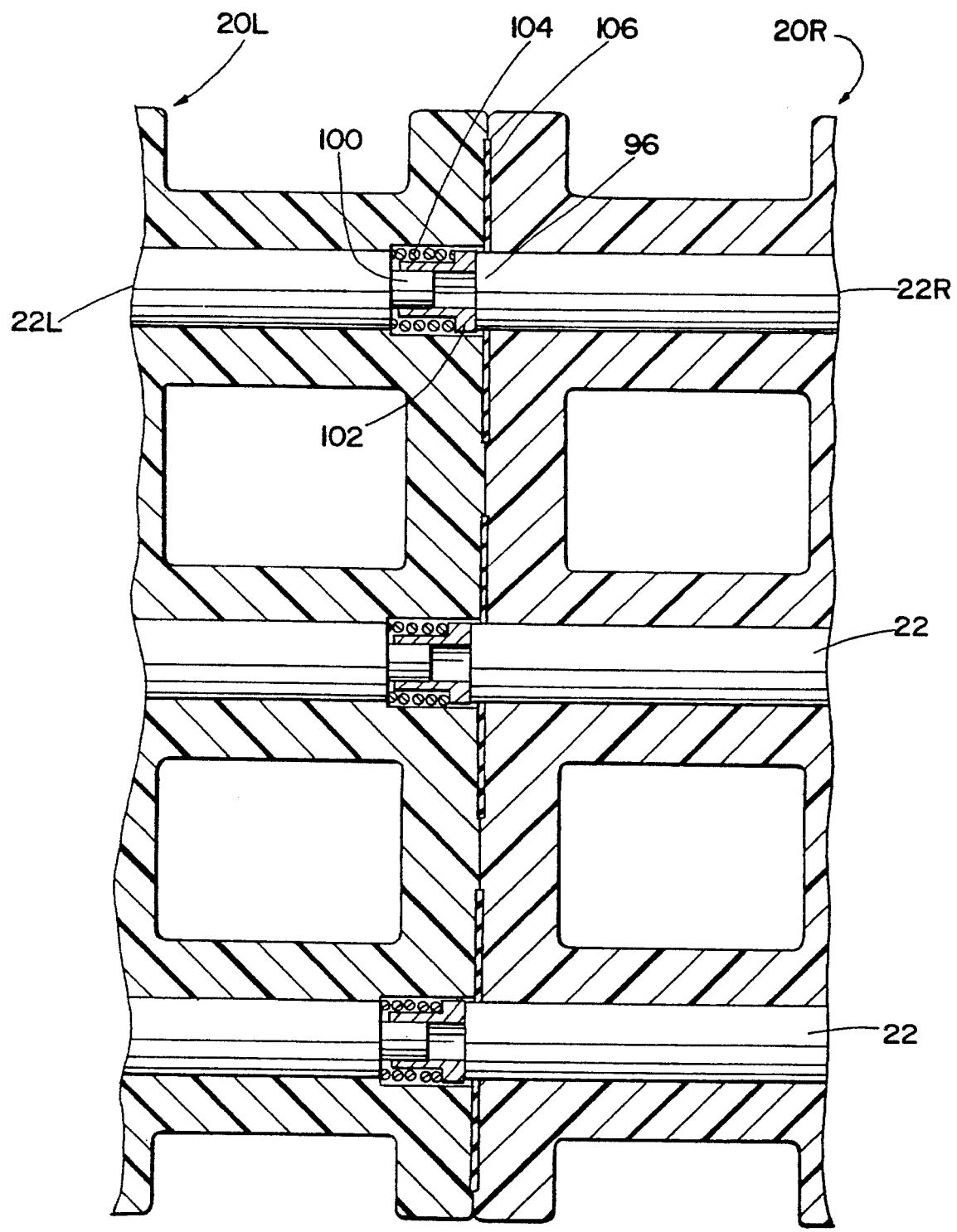
FIG. 15 is a sectional view taken through the bus conductors and illustrating two of the switchgear modules of FIGS. 1–12 interconnected in accordance with the present invention.
Figure 16:
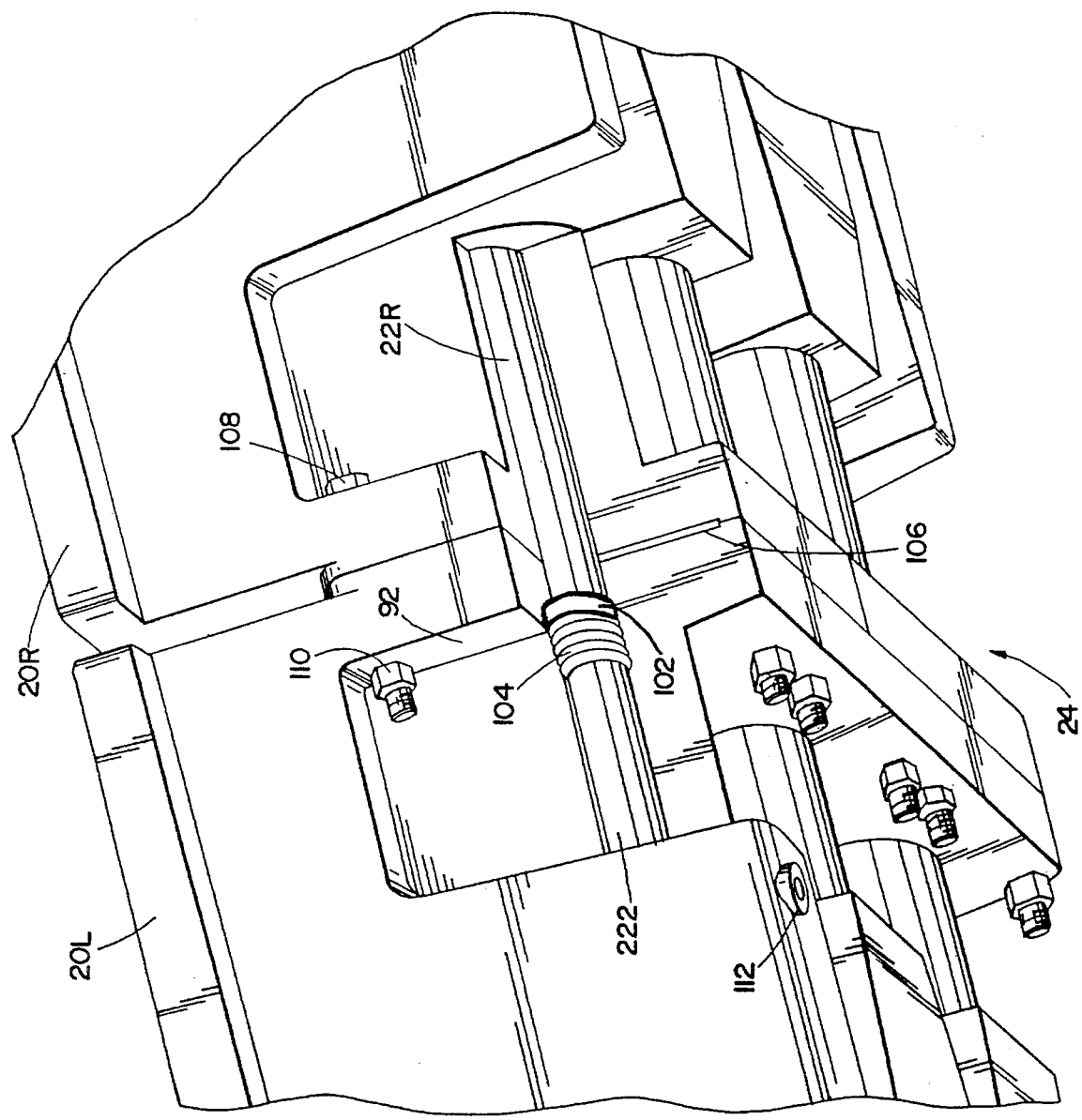
FIG. 16 is a perspective view with parts cut away for clarity of the base portions of two of the switchgear modules of FIGS. 1–12 interconnected in accordance with the present invention and further illustrating the interconnection as shown in FIG. 15.

Referring now additionally to FIGS. 15 and 16, adjacent modules 20 (20-L for the module on the left, and 20-R for the module on the right) are interconnected via the bus conductors 22 in side to side fashion as also shown in FIG. 12 by the use of a tulip contact 102 and a spring 104 (of non-magnetic material) that is positioned over the neck 100 and between the conductors 22-L and 22-R (at flat face 96), a dielectric insulating gasket 106 being positioned between the mounting flanges 92, and the mounting flanges 92 being clamped together by fasteners, e.g. a bolt 108 placed through the flanges (via passages 93) and a nut 110 affixed thereto, axial contact force being established between the flat face 96 and the tulip contact 102 by the spring 104, and contact force between the neck 100 and the tulip contact 102 being provided via the resilience of the tulip contact 102 and the relative dimensions of the tulip contact 102 and the neck 100. As the flanges 92 are clamped together by the fasteners 108,110, the spring 104 is compressed. In this manner, appropriate electrical connection is established between the bus conductors 22 of adjacent sealed modules 20 (20-L and 20-R) after the modules have been completely assembled and filled with the insulating gas.

Further, in addition to the ease of assembly or disassembly of the connection arrangement with sealed modules, the arrangement also provides a wide tolerance for misalignments both axially along the conductors 22, and laterally as to spacing between conductors (via the interface of the surface 96 to the tulip contact 102. The bottom exterior of the base portion 60 is provided with threaded inserts 112 which are useful to provide for the attachment of the module 20 to suitable support structure (not shown).

Referring now to FIGS. 8–11, in a specific embodiment, the central housing portion 50 includes along its lower perimeter 120 a groove 122 that is arranged to interfit with the tongue 65 along the top perimeter 64 of the base portion 60, the groove 122 having a matching pattern to the tongue 65 when overlaid therewith for assembly. Similarly, along the upper perimeter 124 (FIG. 10), the central housing portion 50 (in a specific embodiment includes a tongue 126 to interfit with a groove in the cover 70. The front of the central housing portion 50 includes mounting provisions generally referred to at 130 for the bushings 30 which includes conductors 132 for connection to the bushings 30. Internal to the central housing portion 50, mounting and support provisions 134 are provided about the conductors 132 for attachment of and connection to an upper, movable contact 31 of the loadbreak switches 21 as shown in FIG. 3. Additionally, the central housing portion 50 includes support provisions generally referred to at 136 for the support of a lower contact 138 of the switch 21 (FIG. 3) or the fault interrupter 23 if provided and a disconnect switch with lower contact in the position of 138. The support provisions 136 are generally provided as a horizontally extending shelf portion that extends from the generally vertical front wall of the central housing portion 50. Extending from the support provisions of the shelf 136, the central housing portion 50 further includes a vertically extending wall 140 and a continuing horizontally extending shelf 142 for providing support and mounting of the mechanism 40 and the common operating shaft 43, the horizontally extending shelf 142 extending to the rear wall 144 of the central housing portion 50.

Figure 11:
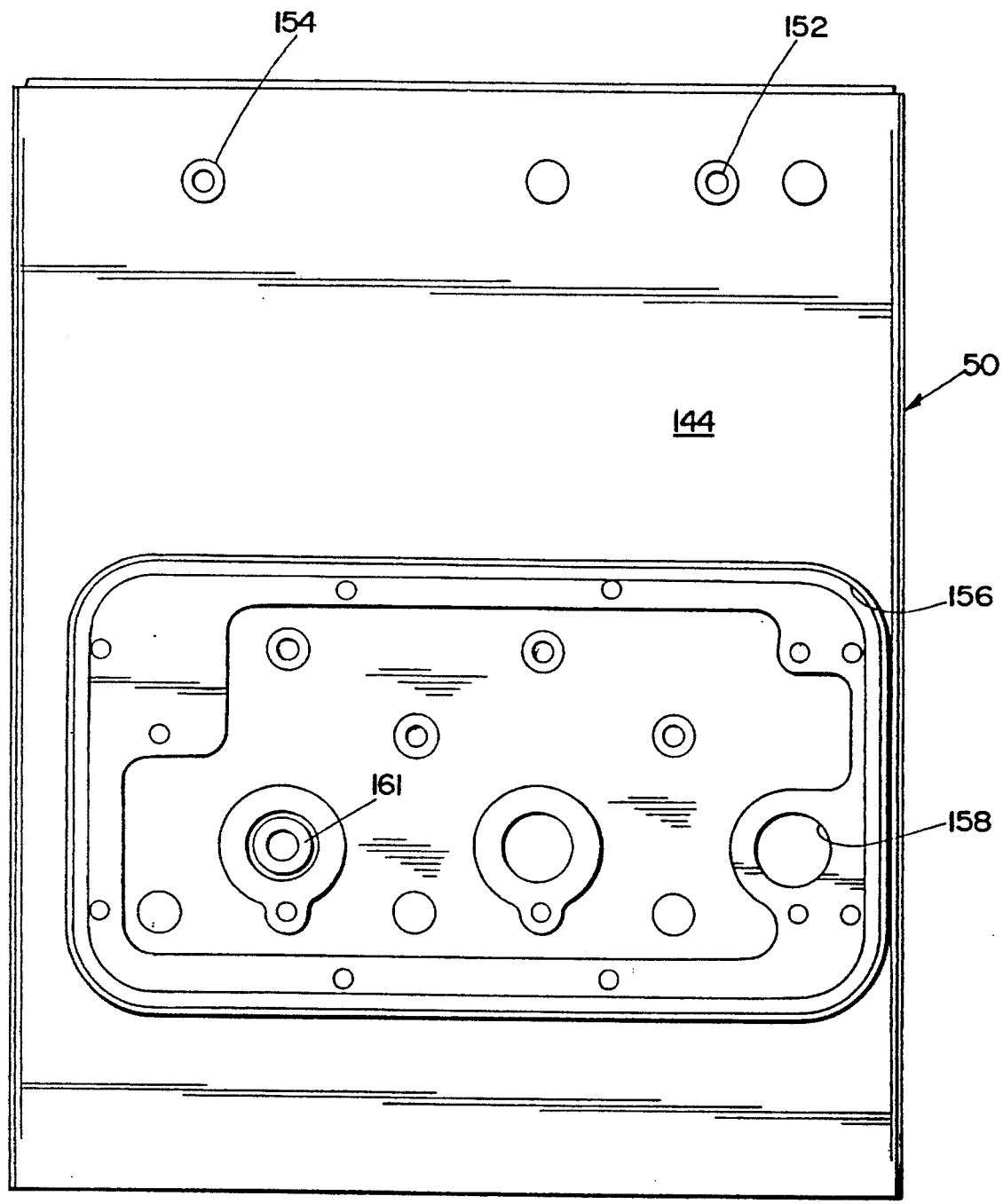
FIG. 11 is a rear elevational view of the central housing portion of FIG. 8.

Mounting provisions generally referred to at 146 (FIGS. 9 and 10) are provided in the form of a shelf or mounting pad for the mounting of a conductive support member 148 (FIG. 3) that spans the width of the central housing portion 50 and carries the ground contacts 33 (FIG. 3). A conductor 150 is provided between the support member 148 and a ground contact 152 that extends through the rear wall 144 of the central housing portion 50. Also extending through the rear wall 144 is a pressure fitting 154 for the attachment to gas filling apparatus and for connection of a pressure gauge 155 (FIG. 19) or indicator or the like. As seen in FIG. 11, the rear wall 144 also includes formed therein a mounting flange and surface 156 to receive the control housing 46. Within the mounting flange and surface 156, operating shaft apertures 158 are provided through the rear wall 144 which are adapted to accommodate shaft seals 161 for sealing the passage of the charging operating shaft 49 from the control housing 46 through the rear wall 144 into the central housing portion 50. The front wall 128 of the central housing portion 50 include bosses or protruding pads 160 in which threaded inserts 162 are provided for the connection of support angles (not shown) and/or ground connections for the cables 35 (FIG. 12) connected to the elbows 32.

Figure 9:
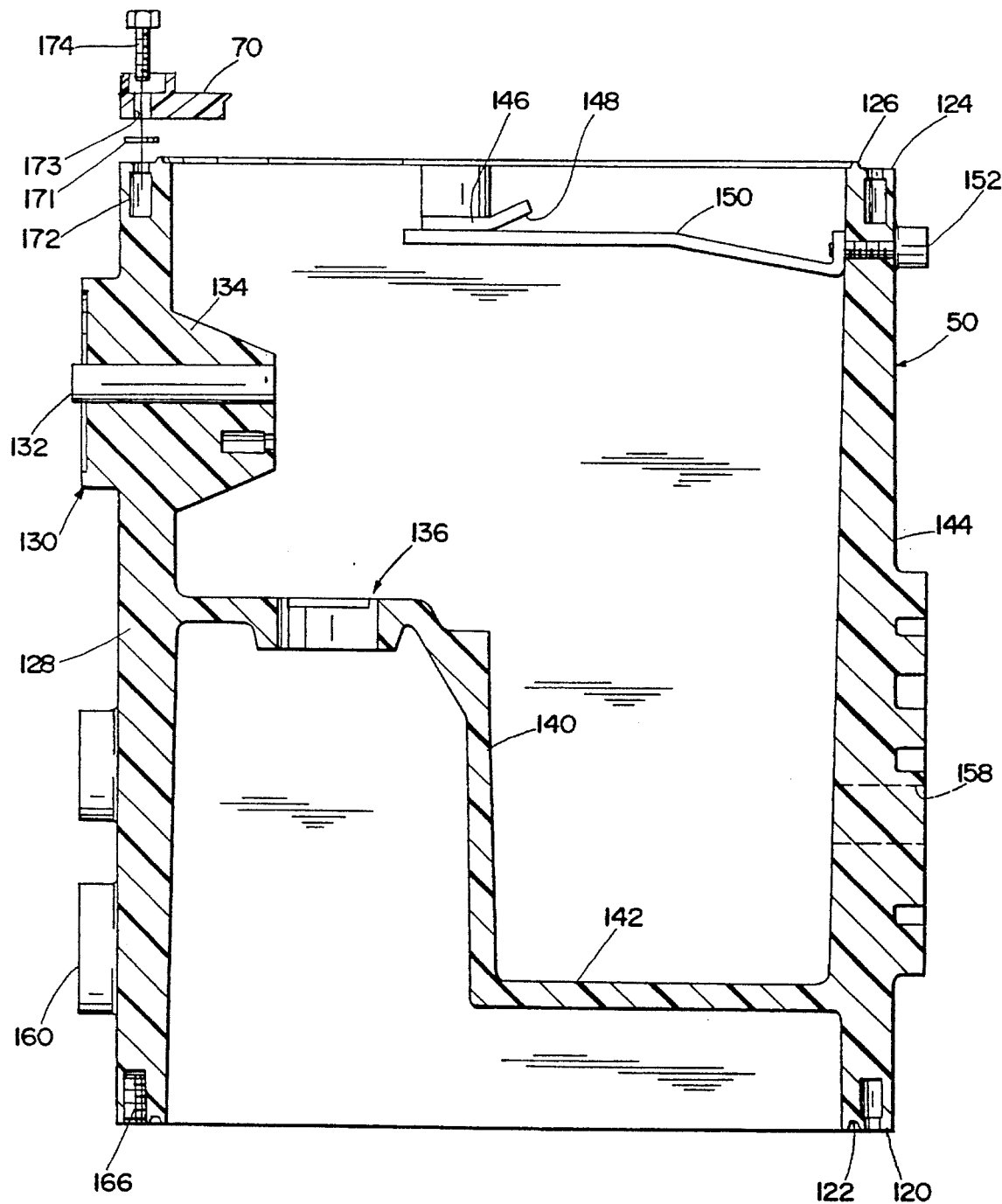
FIG. 9 is a sectional view taken along the lined 9—9 of FIG. 8.
Figure 10:
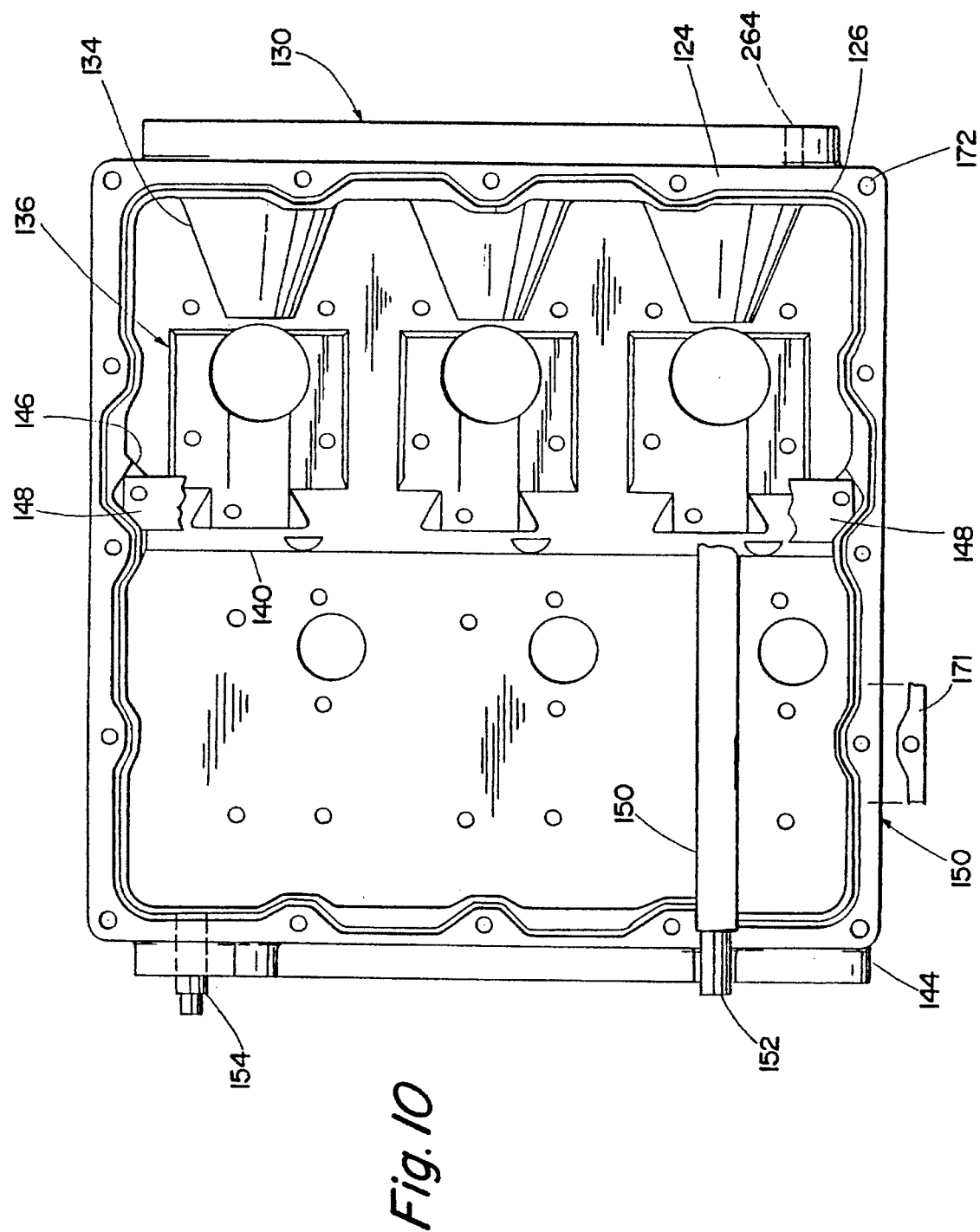
FIG. 10 is a top plan view of the central housing portion of FIG. 8.

Considering now the features of the housing portions 50 and 60 and the cover 70 to facilitate the assembly thereof to form the module 20, the base portion 60 includes a plurality of apertures 164 (FIGS. 4–6) formed through the rim of the mounting flange 64, the base portion 60 further including formed pockets or access spaces 163 to provide access to the underside of the mounting flange 64 along the sides including the bus conductors 22. The central housing portion 50 includes along the lower rim perimeter 120 thereof threaded inserts 166 (FIG. 9). The central housing portion 50 is assembled atop the base portion 60 with fasteners such as bolts 170 (FIGS. 4–6) placed through the holes 164 from the underside of the mounting flange 64 of the base portion 60 and threaded into the threaded inserts 166. In a specific embodiment, a seal member 165 (FIG. 4) or sealing agent is positioned along and between the flanges 64 and 120 before assembly. Preferably, the phase to bus conductor arrangements 63 are assembled into the base portion 60 before assembly thereof to the central housing portion 50. After appropriate assembly of the components into the central housing portion 50, the cover 70 is assembled onto the central housing portion 50. To this end, the upper perimeter or mounting flange 124 of the central housing portion 50 includes threaded inserts 172 (FIGS. 9,10) and the cover 70 includes apertures 173 (FIG. 9) formed through the perimeter of the cover 70 and aligned with the threaded inserts 172. Fasteners such as bolts 174 (FIGS. 1–3 and 9) are positioned through the apertures 173 of the cover 70 and threaded into the inserts 172 to complete the assembly of the module portions 50,60, and 70. In a specific embodiment, a seal member 171 (FIGS. 9,10) or sealing agent is placed between the upper mounting flange 124 of the central housing portion 50 and the cover 70 before the assembly thereof. Considering the fabrication of the housing portions 50, and 60 via molding, the following materials are suitable: cycloaliphatic epoxy, bisphenol epoxy, polyurea, etc. For the cover 70, the following materials are suitable: acrylic, polysulfone, polyethersulfone, polycarbonate, polyurethane, etc. In a preferred arrangement, the outer surfaces of the switchgear module 20 are covered with a semiconductive coating since it is desirable to maintain all the outer surfaces at earth potential. While a specific illustrative embodiment has been described where the housing portions 50 and 60 include molded tongue and groove features on a mounting flange to aid in assembly, in another specific embodiment, the tongue and groove structure are omitted and a sealing tape (not shown) is disposed about the mounting flanges, e.g. 64,120,124. In lieu of the grooves, e.g. 122, a low depth channel (not shown) is provided to appropriately position the sealing tape.

Figure 17:
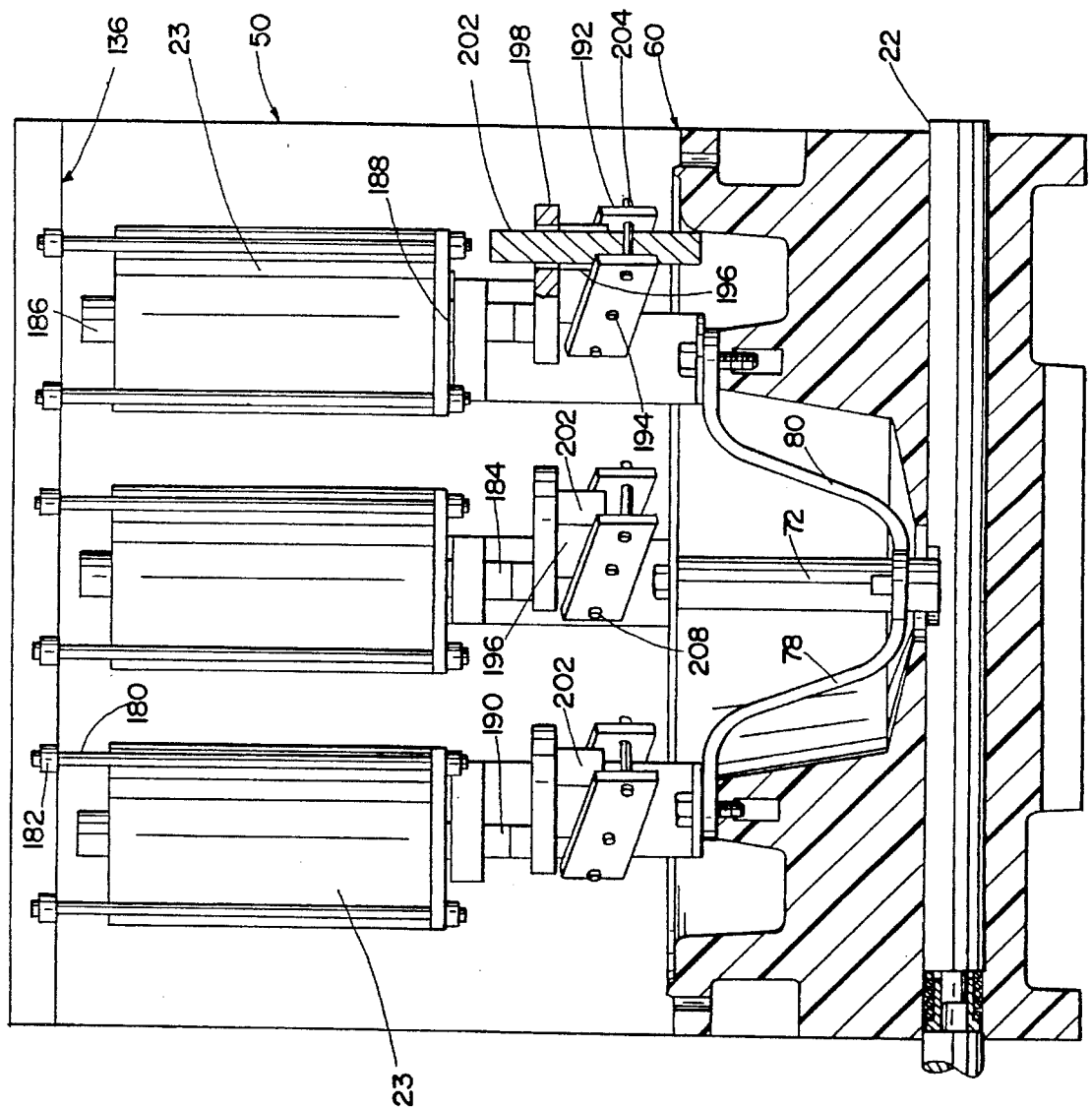
FIG. 17 is a partial rear elevational view of the switchgear module of FIGS. 1–3 with parts cutaway and removed for clarity.
Figure 18:
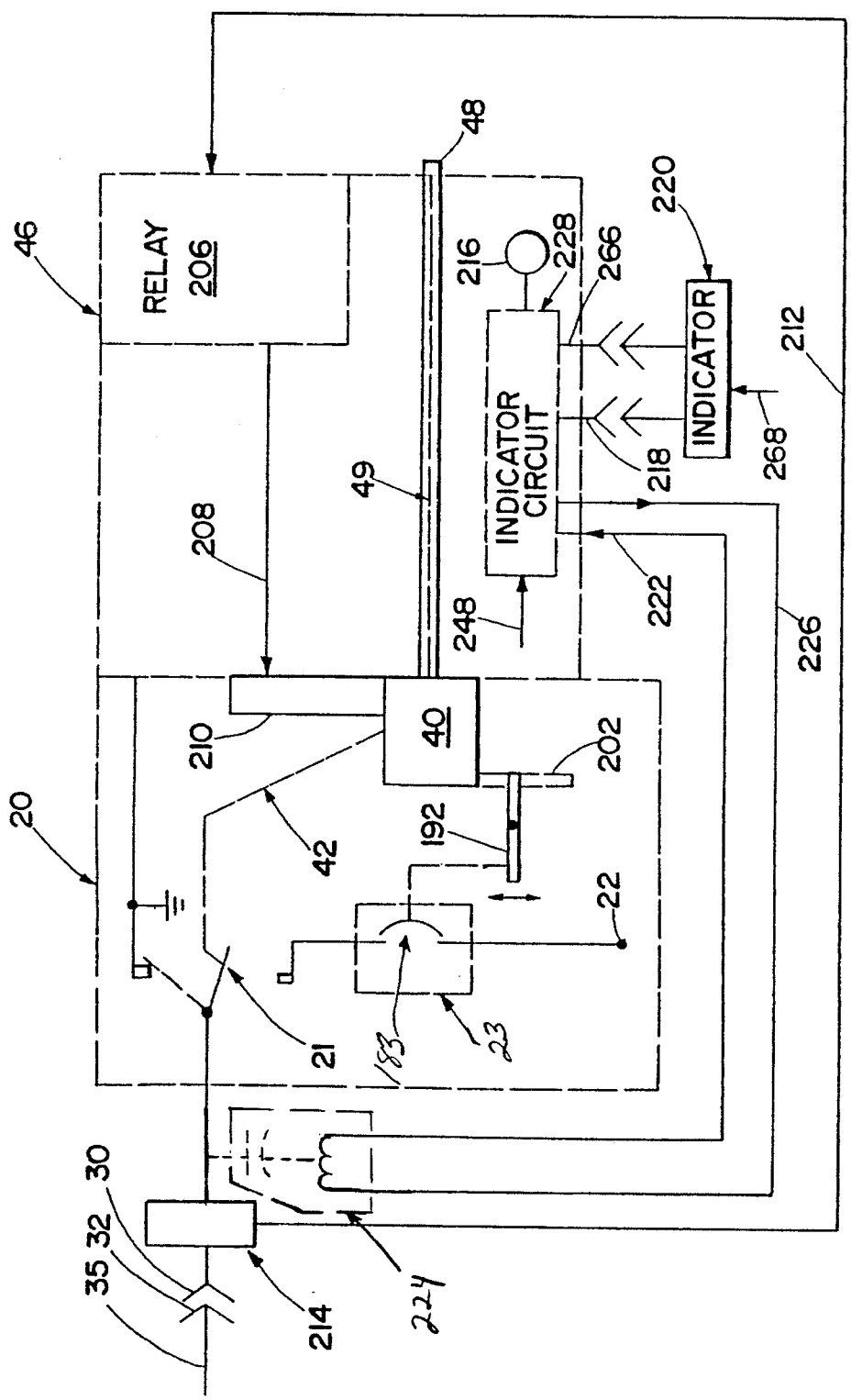
FIG. 18 is a diagrammatic and electrical schematic representation of portions of the switchgear module of FIGS. 1–17 illustrating operation and control.

Turning now to a discussion of the configuration of the switchgear module 20 that includes a fault interrupter 23 and referring now additionally to FIGS. 17 and 18, the fault interrupter 23 for each pole or phase, as shown in phantom in FIG. 3, is mounted with respect to the support 136 via insulated fasteners such as bolts 180 and nuts 182. The fault interrupter 23 in a specific embodiment is a vacuum interrupter having a set of contacts 183 (FIG. 18) that are operable via movement of an operating pin or rod 184 that is biased downwardly in FIG. 17 to a contact-open position and movable upwardly to closed contact position. The circuit to the fault interrupter 23 is defined between an upper contact connector 186 and a lower contact connector 188. The upper contact connector 186 is connected to the lower contact 138 of the switch 21 which is arranged as a disconnect switch instead of a load interrupter switch when the fault interrupter 23 is provided. Each of the lower contact connectors 188 is connected through a respective bus conductor 190 to one of the conductors 72, 78, or 80 to provide an electrical circuit to a respective one of the bus conductors 22b, 22a, 22c. The fault interrupters 23 are operated via levers 192 which are pivotally supported at their middles by a pin 194 carded by a bracket 196 that extends from a support 198 that is affixed to the shelf 142 (FIGS. 3 and 9). A first end of the lever 192 is connected to the operating pin 184 via a pin 200 that extends through the lever 192 and the operating pin 184. The other end of the lever 192 is connected to a shaft 202 via a pin 204. The shaft 202 is operated by the mechanism 40 so as to be held in a downward position in FIG. 17 to hold the fault interrupter 23 in a closed-circuit condition, while the shaft 202 is released to move to an upward position permitting the fault interrupter 23 to move to an open circuit condition via movement of the operating pin 184 pivoting the lever 192.

Figure 19:
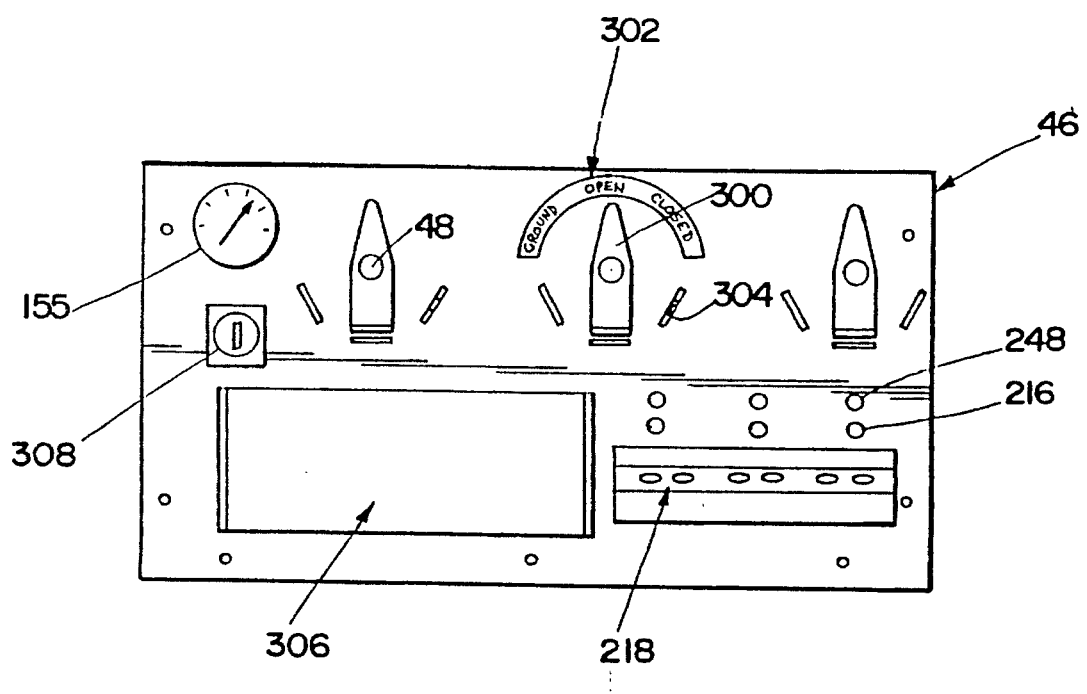
FIG. 19 is a top plan view of one specific embodiment of the control housing of the switchgear module of FIGS. 1–3 and 18.

Referring now additionally to FIGS. 18 and 19 and considering electrical circuit operation, in a specific embodiment, the mechanism 40 is controlled by either a relay control 206 or the manual operator control 48 to operate the fault interrupter 23 through the shaft 202 and the lever 192. For control via the relay 206, the relay provides an output signal at 208 to operate a solenoid 210. The solenoid 210 is arranged via the mechanism 40 to release the shaft 202. For manual control, the operator control 48 directly operates the mechanism 40. The relay 206 outputs the signal at 208 in accordance with predetermined time-current characteristics so as to control circuit-interrupting action in response to overcurrent conditions. For example, in one specific arrangement, the relay 206 receives a sensed-current signal at 212 that is provided by a current sensor 214 or the like preferably mounted about the bushing 30, or alternately, about the cable 35.

Voltage indication is also provided either by an integral indicator circuit 228 and indicator 216 or via an external connector 218 and a portable indicator device 220 with indicator circuit similar to 228. A sensed-voltage signal at 222 is provided from a voltage sensor 224 mounted, for example, in or around the bushing 30. Thus, the presence or absence of voltage on the cable 35 and switch 21 can be verified. As is common, the integral indicator circuit and the portable indicator circuit 220 include test features which test the operation of the indicator circuit. In accordance with important aspects of the present invention, in order to test the reliability of the voltage indicator circuit, in addition to the common test feature to check the operation of the indicator circuit before and/or after testing for voltage indication from the sensed voltage signal on line 222 from the voltage sensor 224, an additional test path is provided, via the lead 226 for example. In this manner, not only is the operation of the indicator circuit tested, the integrity of the voltage sensor 224 and the signal path via the sensed voltage signal lead 222 is also tested. In the specific illustration, a push-to-test input 248 to the indicator circuit 228 provides connection of a voltage source to the lead 226 with a circuit being established through the lead 226, through the voltage sensor 224 and back through the sensed voltage signal lead 222 into the indicator circuit 228. Similarly, the portable indicator device 220 includes a push-to-test input 268. Thus, if the sensing circuit is not operational and complete, this will be shown during testing whereas conventional test features and circuits instead provide false information. For example, if the lead 222 is broken or shorted, when the indicator and circuit are tested via conventional methods and circuits, the indicator 216 would operate to give a positive indication just as if the lead 222 were operational. However, if an operator saw no indication of sensed voltage in the normal mode and the indicator then operated in the test mode, the operator would assume that the cable 35 was deenergized, just as when the sensed voltage circuit was operational and the cable 35 deenergized. This false information could cause the operator to conclude that deenergized conditions exist when in fact the cable and other circuit conductors are energized. With the present invention, if the sensed voltage lead 222 was broken or shorted, the test would not operate the indicator 216. This absence of indicator operation will alert the operator that the sensed voltage circuit or indicator circuit is non-operational resulting in the operator properly treating the cable 35 as possibly being energized, as contrasted to the conventional test circuits which would cause the operator to conclude that the cable 35 was deenergized when actually energized.

Referring now to the specific illustrative arrangement of a control panel section on the top of the control housing 46 in FIG. 19, the operating hub 48 carries a position indicator 300 which cooperates with indicia 302 on the top of the control housing 46 to depict the position of the switches 21, i.e. grounded, open or closed. In the specific illustrative embodiment, upstanding tabs 304 having an aperture are provided which are cooperable with upstanding portions of the respective indicators 300 also including apertures for receiving a shackle of a padlock or the like (not shown) for locking of the indicator and operating hub 48 in a predetermined operating position. Access to the relay control 206 is made available via a access panel 306 which may include programming inputs (not shown) for the relay control 206. A gas-filling port 308 is provided that is connected to the pressure fitting 154. Also shown is the pressure gauge 155, the indicator 216, the push-to-test input 248 and the external connector 218, all as referred to hereinbefore.

Considering now, in more detail, the operation of the switchgear module 20 including a fault interrupter 23 and a switch 21 arranged as a disconnect, for opening operation, the mechanism 40 is arranged to sequence operation to open the fault interrupter 23 before the disconnect 21 so that the fault interrupter 23 breaks the circuit. Further, during closing operation, first the fault interrupter 23 is closed before the disconnect 21 so that closing is on the disconnect 21. If a fault condition exists on closing, the fault interrupter 23 is opened via the relay 206 and the solenoid 210. In the configuration where the switchgear module is equipped only with the loadbreak switch 21, the loadbreak switch includes fault-closing capabilities with circuit interruption then being handled by other protective devices either upstream or downstream of the switchgear module 20.

In accordance with important aspects of the present invention relating to the operation of the switchgear modules 20, in a specific embodiment, the switchgear module 20 in a preferred embodiment includes a complete internal and integral system to satisfy desirable operating practices to deenergize, test and ground the circuit before working thereon. Specifically, the switchgear module 20 includes the integral indicator circuit 228 and indicator 216 and/or the portable indicator device 220 (each with test feature), a visible open gap in the circuit which is provided by the switch 21 and which is readily observable externally to the module, and a ground position for the switch 21 to effectively ground the circuit. In a preferred arrangement, the cover 70 is either transparent or includes transparent portions or windows over each of the switches 21. For example, operating personnel can establish desired working conditions that satisfy operating practices merely by opening the switch 21 via the operator control 48, utilizing the indicator 216 and the test feature to establish the absence of voltage, and then place the switch 21 in the ground position at 33. Then, the connected line may be maintained or worked as desired in accordance with further operating practices relating to tagging and establishing clearances. Additionally, the observation of the open gap of the switch 21 when in the open position satisfies operating practices that entail establishing circuit conditions by virtue of a visible open gap such as section 173C of the National Electrical Safety Code.

Figure 6:
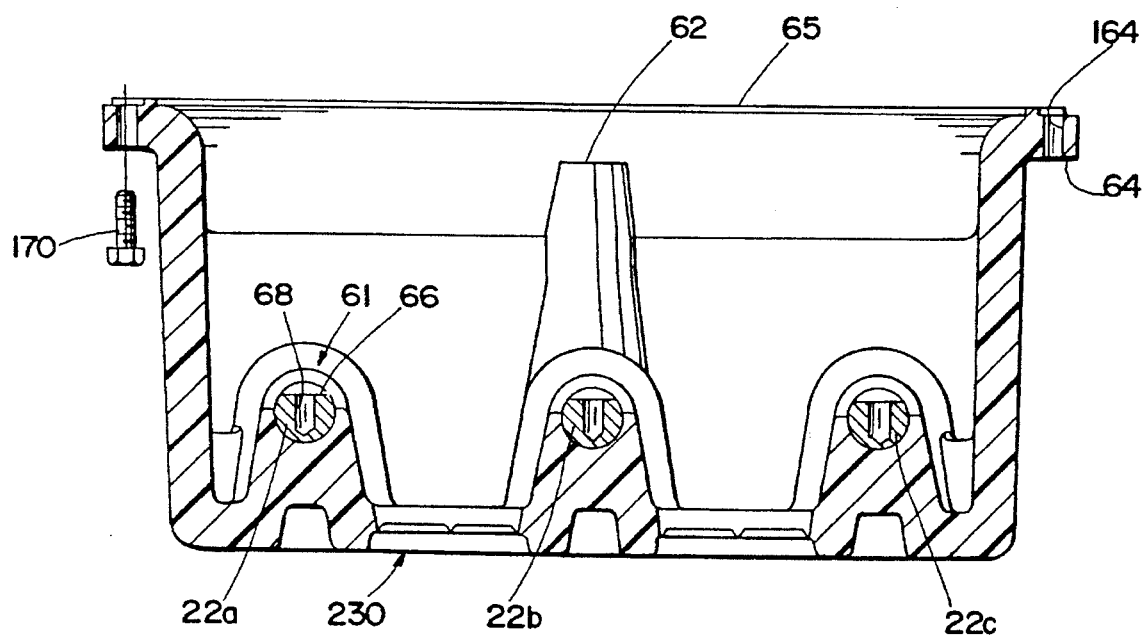
FIG. 6 is a sectional view taken from the line 6—6 of FIG. 4.
Figure 7:
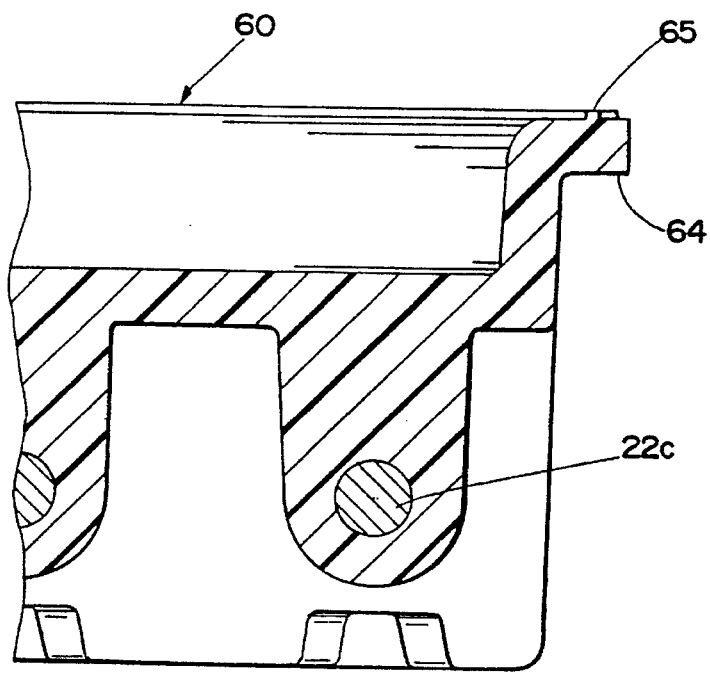
FIG. 7 is a sectional view taken from the line 7—7 of FIG. 4.
Figure 8:
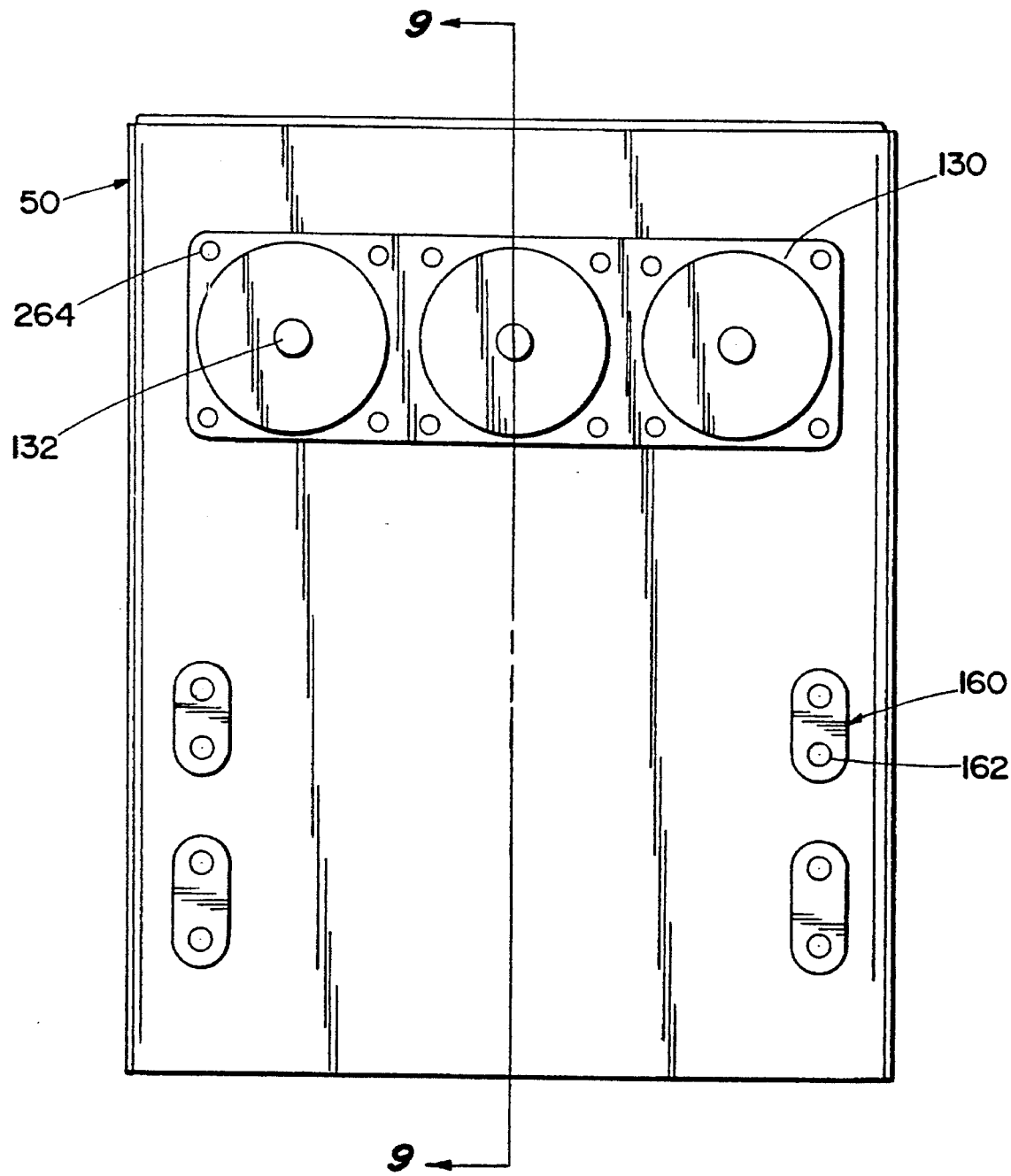
FIG. 8 is a front elevational view of a central housing portion of the switchgear module of FIG. 1 with parts removed for clarity.
Figure 20:
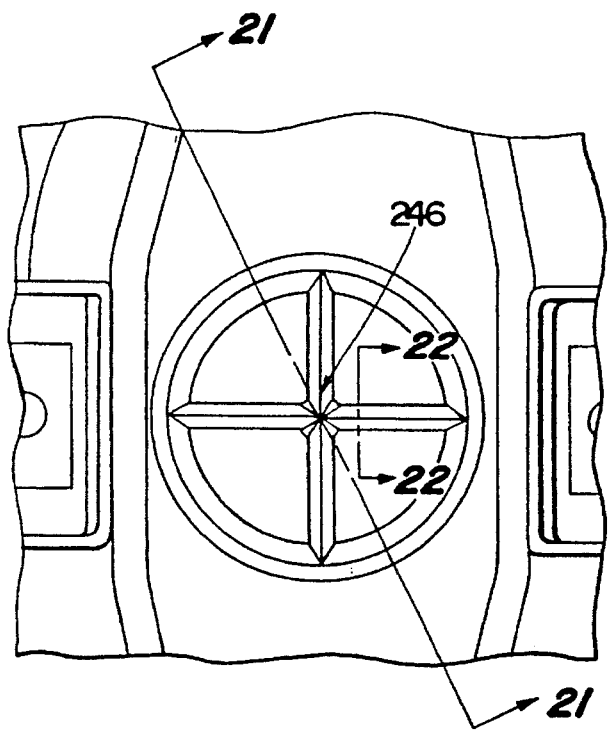
FIG. 20 is a partial top plan view of a portion of the base portion of FIGS. 4–7.
Figure 21:
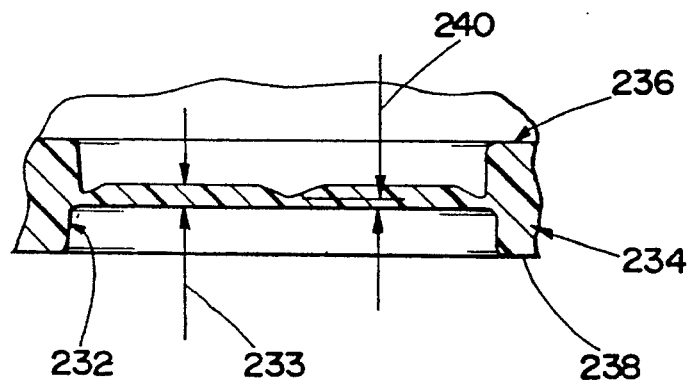
FIGS. 21 and 22 are sectional views taken along the lines 21—21 and 22—22 respectively of FIG. 20.
Figure 22:
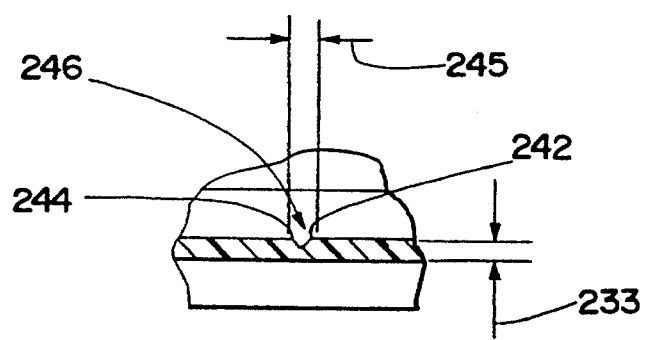

In accordance with other important aspects of the present invention and referring now to FIGS. 2,5, and 6, and additionally to FIGS. 20–22, the switchgear module 20 includes in the bottom of the base portion 60, one or more pressure relief features generally referred to at 230 that are integrally provided (molded in) during the molding of the base portion 60 via a thin section of a predetermined pattern. The pressure relief feature 230 is arranged so as to pressure relieve the switchgear module 20 when the internal pressure exceeds a predetermined value. Specifically, the section 230 includes a generally circular area 232 of reduced wall thickness defined at 233 of the bottom wall 234 of the base portion 60 which is defined intermediate and generally midway between the upper wall surface 236 and the lower wall surface 238. In accordance with important aspects of the present invention, the circumference of the area 232 along with a predetermined pattern which segments the area 232 includes a still further reduced wall thickness as shown at 240. The reduced thickness at 240 is defined, for example, as shown in FIG. 22 by inclined side walls 242,244 to define a trough 246 having a width 245. In a specific embodiment, the predetermined pattern segments the area 232 into four parts and is formed by two perpendicular diameters of the circular area 232. For example, with a wall thickness in the area 232 of approximately ⅛–3/16 of an inch in combination with the pattern of reduced thickness at 240 of 0.040–0.070 of an inch, it has been found that pressure relief via the section 230 becoming disintegral will occur when the internal pressure differential exceeds approxiamtely 55–60 psi. Of course, it should be realized that the section 232 and described pattern to segment the area 232 are merely illustrative and should be realized that other shapes for the area 232 and other patterns of further reduced cross section or thickness of the wall thickness 233 at 240 may also be utilized in other specific embodiments to practice the invention to provide an integrally molded pressure relief feature.

Figure 23:
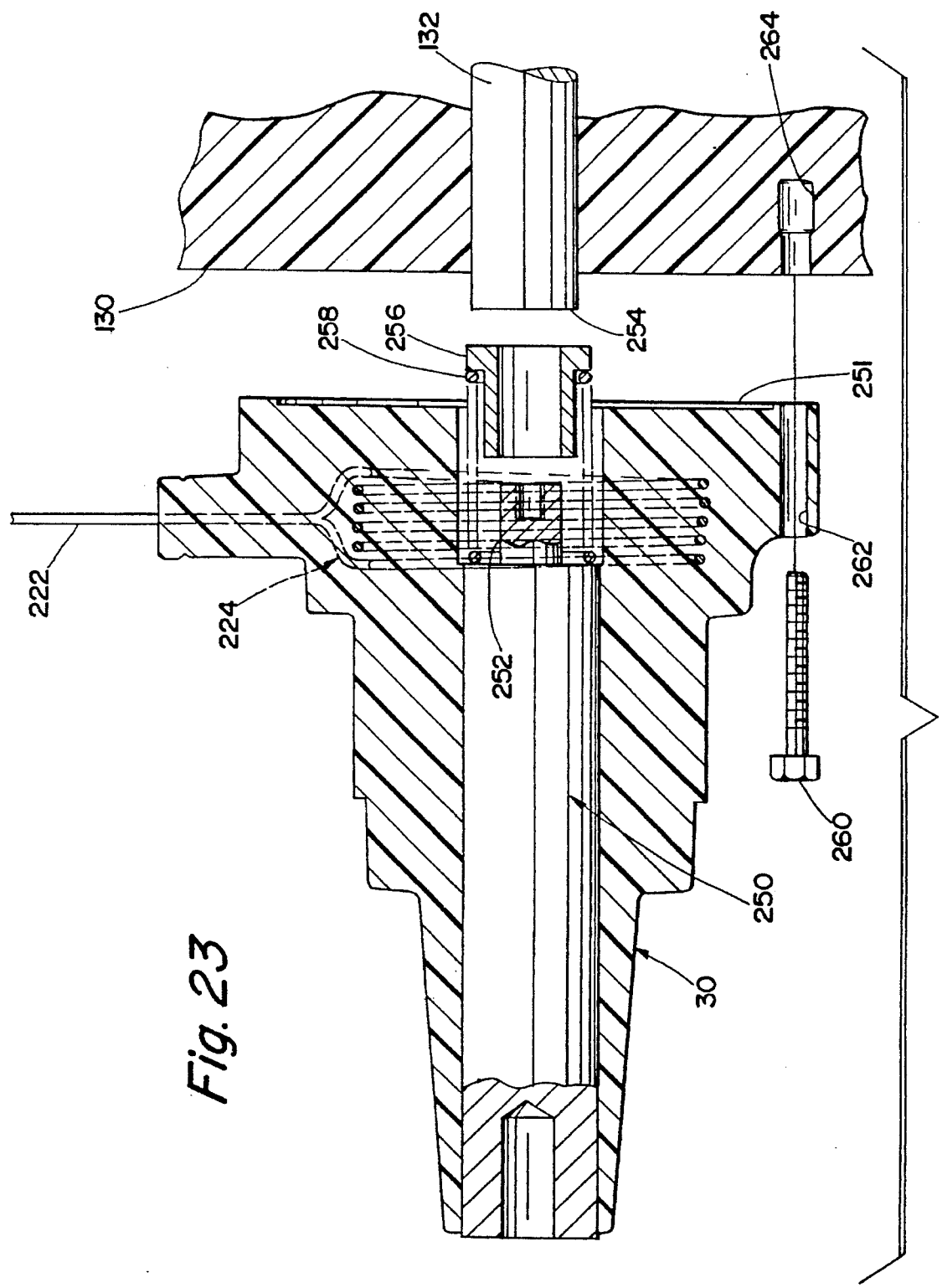
FIG. 23 is a sectional view of the bushing of the switchgear module of FIGS. 114 3.
Figure 24:
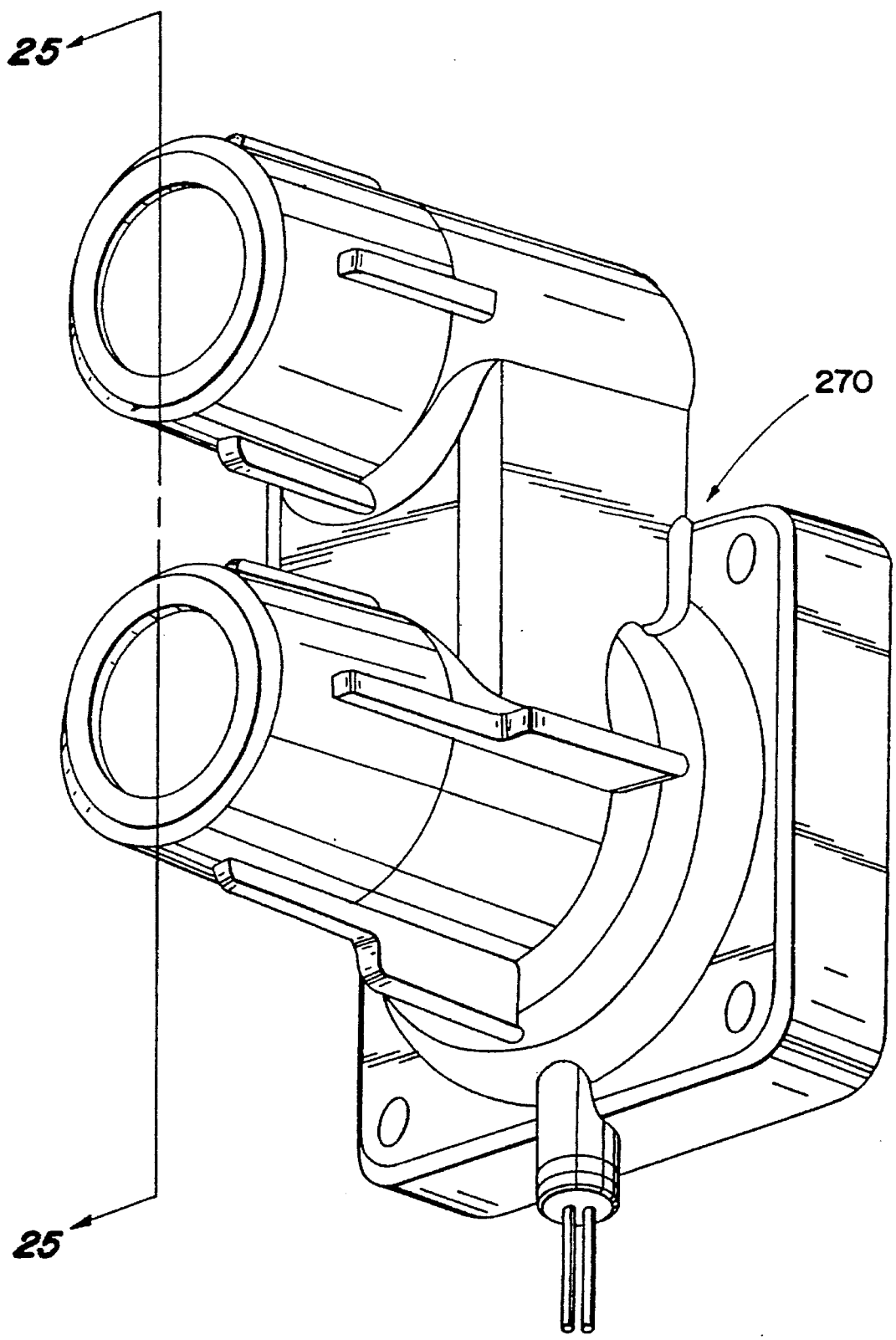
FIG. 24 is a perspective view of an alternate termination connection device to the bushing of FIGS. 1–3 and 23 in the form of a double bushing well.
Figure 25:
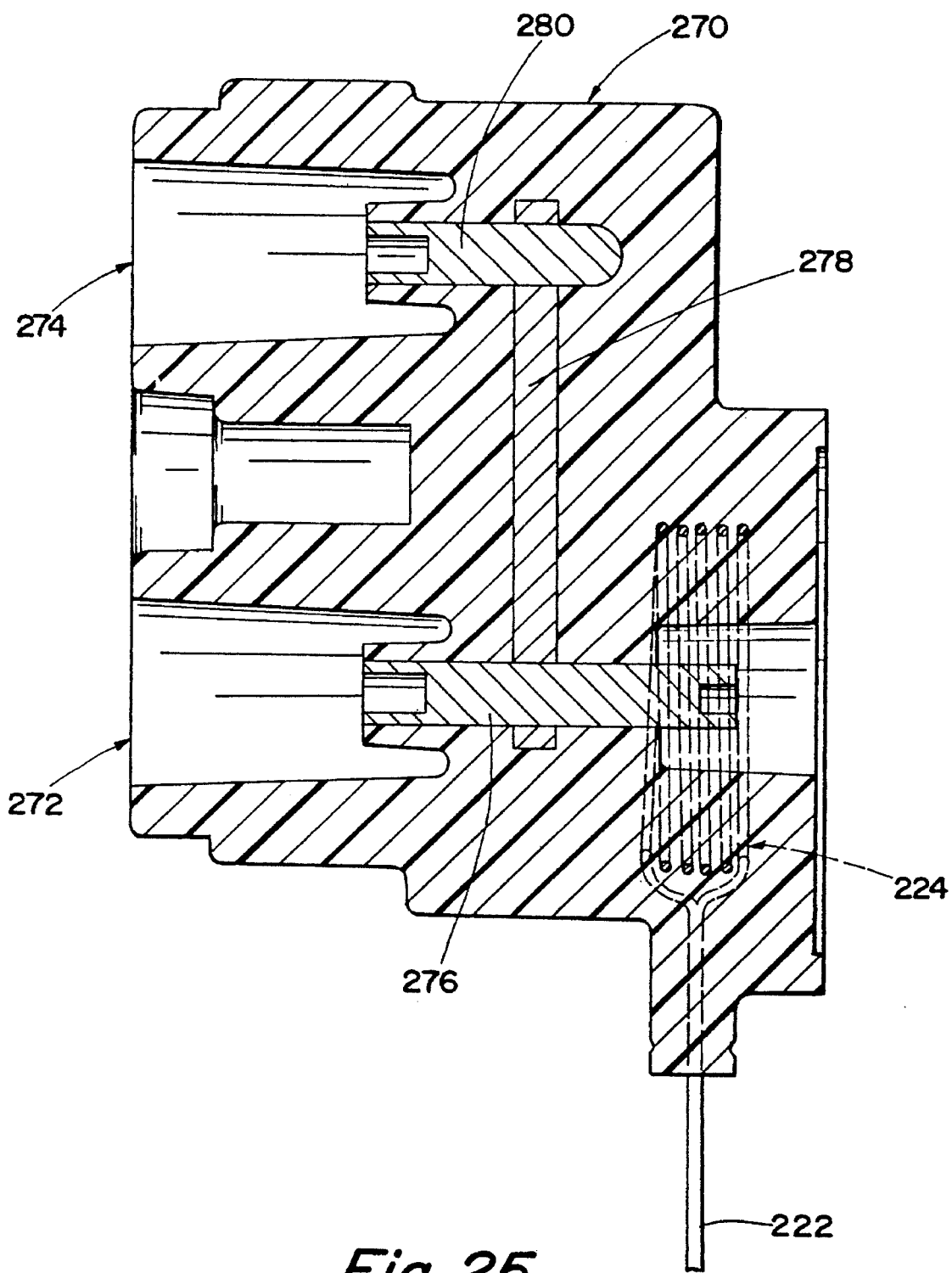
FIG. 25 is a sectional view taken along the line 25—25 of FIG. 24.

In accordance with other important aspects of the present invention and with reference to FIGS. 1–3 and 8–10, and with additional reference to FIG. 23, the switchgear module 20 provides the replacement of the bushing 30 or other connected termination device in a simple manner and without the loss of the seal of the pressurized internal volume. Specifically, an interconnection arrangement as described hereinbefore relating to the interconnection of the bus conductors 22 of adjacent switchgear modules 20 is utilized for the bushing 30. The bushing 30 (FIG. 23) includes a conductor 250 having a narrowed cylindrical extending neck portion 252 (positioned within the bushing 30 so as to be a predetermined distance within the inner face of the bushing flange 25 1 that interfaces the mounting provision 130). Further, the conductor 132 (FIGS. 8 and 9) of the mounting provisions 130 includes a flat face 254. Similarly to the interconnection arrangement for the bus conductors 22, a tulip contact 256 and carried encircling spring 258 are positioned over the neck portion 252, and the bushing 30 clamped to the mounting provisions 130 to provide appropriate connection of the conductors 132, 252 via the tulip contact 256. In a specific embodiment, the clamping of the bushing 30 to the mounting provision 130 is accomplished by bolts 260 positioned through passages 262 in the bushing flange 251 and threaded into threaded inserts 264 carried within the mounting provision 130 (front wall 128) of the central housing portion 50. Thus, the bushing 30 may be replaced simply by the disassembly of the bolts 260 while the seal integrity of the switchgear module is totally unaffected. Referring additionally now to FIGS. 24 and 25, a double bushing well 270 is provided with the same interconnection features as discussed relating to the bushing 30 while also providing the feature of two bushing wells 272,274 which are provided with suitable configurations for accepting desired bushing inserts(not shown). The bushing well 272 includes a conductor 276 which is arranged and configured (as discussed hereinbefore regarding the bushing 30) to be interconnected with the mounting provisions 130. A conductor 278 is attached to the conductor 276 and also attached at its other end to another conductor 280 which provides the center conductor for the bushing well 274. Preferably, the voltage sensor 224 is integrally molded into the bushing 30 and the double bushing well 270 during fabrication thereof.

Figure 26:
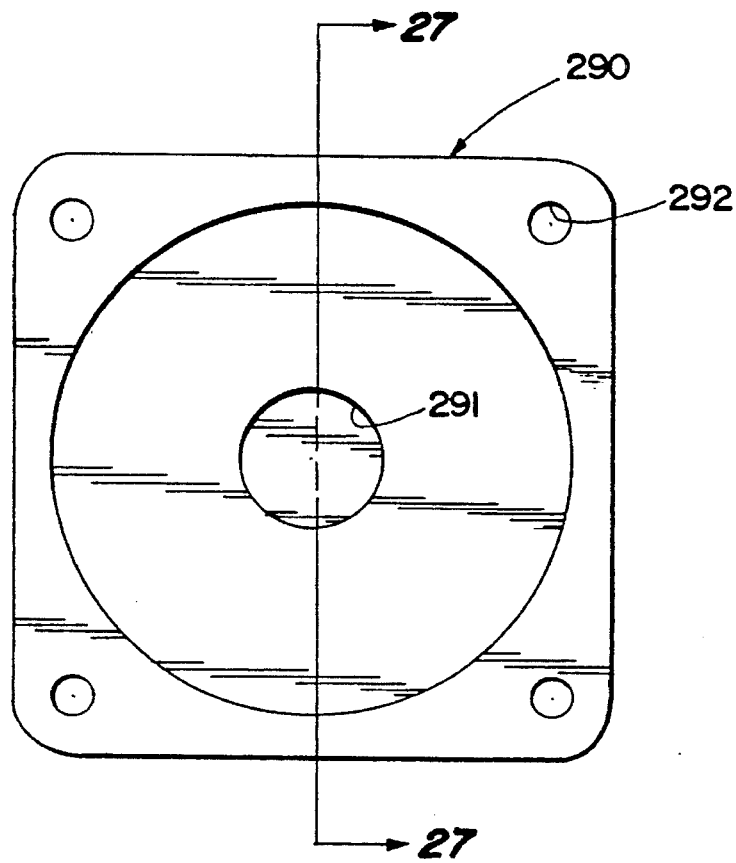
FIG. 26 is an elevational view of an interconnection cover for use with the switchgear module of FIGS. 1–19.
Figure 27:
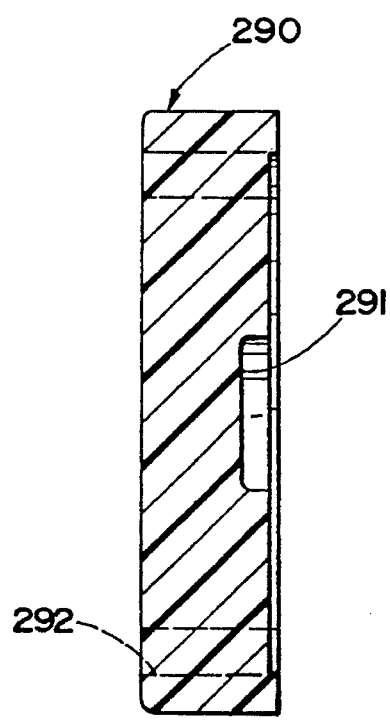
FIG. 27 is a sectional view taken along the line 27—27 of FIG. 26.

Considering other aspects of the present invention and referring additionally to FIGS. 26 and 27, an interconnection cover 290 is useful to cover the interconnection provisions 24 and the external portions of the bus conductors 22, e.g. during transit, storage, or for the nonconnected end switchgear modules 20 of a configuration such as the modules 25 and 28 in FIG. 12. The interconnection cover 290 is fabricated with overall dimensions and contour including a central recess 291 to accommodate and cover the conductors 22 at either side of the switchgear module 20 and further includes passages 292 at each of the four corners that are aligned with the passages 93. Assembly of the interconnection cover 290 is accomplished by fasteners cooperating with the inner mounting flange 94 as described hereinbefore for the interconnection arrangement 24. The dielectric insulating gasket 106 is also utilized. The cover 290 may also be utilized with the bushing interconnection conductor 132 and the mounting provision 130, e.g. where the terminations will not be used such as when the switchgear module 20 is utilized as a tie switch.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A switchgear for medium-voltage electrical power distribution module comprising:

electrical components; and means for housing and supporting said electrical components, said housing and supporting means comprising at least first and second housing portions and cooperating means for assembling said at least two housing portions in a predetermined manner to provide a gastight seal for a predetermined pressure, said first housing portion comprising means integrally molded therein for supporting said electrical components, said electrical components including means for defining connections for predetermined cable termination devices on the exterior of said first housing portion, said second housing portion comprising bus conductor means integrally incorporated within said second housing portion so as to provide external access to said bus conductor means at two predetermined locations on the exterior of said second housing portion and internal connection access points to said bus conductor means internal to said second housing portion.

2. The switchgear module of claim 1 further comprising means for defining predetermined interconnection features adjacent said bus conductor means at said predetermined locations for interconnection of said bus conductor means to the bus conductor means of other of said switchgear modules.

3. The switchgear module of claim 1 wherein said second housing portion is a base having sidewalls, a closed bottom, and a generally open top.

4. The switchgear of claim 3 further comprising a third housing portion, said first housing portion having sidewalls, a generally open top that interfits with said third housing portion, and a generally open bottom that interfits with said top of said base.

5. The switchgear of claim 4 further comprising bus connection means for defining electrical connections between said bus conductor means and selected ones of said electrical components.

6. The switchgear of claim 4 further comprising mechanism means for operating selected ones of said electrical components, said first housing portion further comprising means integrally molded therein for supporting said mechanism means.

7. An arrangement for the interconnection of at least first and second external bus conductors of a plurality of switchgear modules in side to side fashion to form a lineup of said switchgear modules, wherein each of said switchgear modules includes two generally parallel external side surfaces, means for defining on each of said two external side surfaces access to said bus conductors, and first means for facilitating and providing interconnection of said bus conductors on said external side surfaces to said bus conductors of an adjacent switchgear module in the lineup, said first means comprising second means for interconnecting said bus conductors of adjacent of said switchgear modules, said second means including means for clamping together of said adjacent external side surfaces.

8. The arrangement of claim 7 wherein said second means comprises fastener means inserted from behind said external surfaces.

9. The arrangement of claim 7 wherein said first means further comprises said bus conductors including predetermined shapes at the points of interconnection at said external surfaces.

10. The arrangement of claim 7 wherein said interconnecting means further comprises third means positioned between said bus conductors of adjacent switchgear modules for cooperating with said bus conductors to provide the electrical interconnection.

11. The arrangement of claim 10 wherein said bus conductor at a first side of each of said switchgear modules includes a narrowed extending portion and said bus conductor at a second side of each of said switchgear modules includes a flat face, said third means comprising a tubular contact having a widened base portion positioned against said flat face and about said narrowed extending portion, and means for biasing said tubular contact against said flat face.

12. The arrangement of claim 11 wherein said biasing means comprises a spring placed about the tubular contact and over said narrowed extending portion.

13. An arrangement for providing various configurations of switchgear modules that define a gas-filled internal volume by the combining of a plurality of said switchgear modules, each of said switchgear modules including a front portion including cable termination provisions and first and second opposed side portions adjacent said front portion, each of said switchgear modules including one or more complements of electrical components and at least three bus conductor provisions defining an external connection point for each bus conductor on each of said first and second opposed sides, the arrangement being characterized by the provision of means for interconnecting said external connection points of said switchgear modules when said switchgear modules are arranged in side to side fashion such that said first side portion of a first of said switchgear modules is connected to said second side portion of a second of said switchgear modules that is adjacent to said first of said switchgear modules, said interconnecting means comprising means for exerting force to draw said external connection points of said bus conductors of said adjacent switchgear modules together.

14. The arrangement of claim 13 wherein said interconnecting means further comprises means for rendering operative said force exerting means from external locations of said switchgear modules that are not on said first or second opposed sides.

15. The arrangement of claim 13 wherein said interconnection means further comprises means for providing access to manipulate said force exerting means when said switchgear modules are arranged side to side.

16. The arrangement of claim 13 wherein said cable termination provisions comprise means for replacing said cable termination provisions while preserving the seal of said gas-filled internal volume.

17. The arrangement of claim 13 wherein said force exerting means is operable to disconnect said adjacent switchgear modules when said switchgear modules are arranged side to side.

18. The arrangement of claim 13 wherein said switchgear modules comprise a molded housing defining said external connection points of said bus conductors.

19. The arrangement of claim 13 wherein said interconnection means comprises means for accommodating for misalignment between said external connection points of said side by side switchgear modules.

20. Switchgear for medium-voltage electrical power distribution comprising housing means defining a gas-filled sealed interior volume, two or more switches each of which is operable from a first, closed position to a second, open position to establish a visible open gap and each of which is operable from said second, open position to a third position, and mechanism means for defining three distinct operating positions and for selectively operating said two or more switches to said first, second and third positions, said housing means comprising means for viewing said open gaps.

21. The switchgear of claim 20 wherein said housing means comprises a transparent area adjacent said open gaps of said switches.

22. The switchgear of claim 20 wherein said housing means comprises at least first and second housing portions which are assembled in a predetermined manner, said first housing portion being fabricated so as to be transparent.

23. The switchgear of claim 20 further comprising a ground connection and wherein each of said switches in said third position is connected to said ground connection, said housing means further comprising means for viewing said switches in said third position.

24. The switchgear of claim 20 further comprising means for indicating the presence of voltage to one side of each of said switches.

25. The switchgear of claim 24 wherein said indicating means comprises means for testing the operable status of said indicating means independent of said presence of voltage.

26. An arrangement for providing different circuit configurations of electrical components by combining individual switchgear modules for medium-voltage electrical power distribution each of which defines in a gas-filled volume a polyphase circuit each phase of which includes one or more electrical components, each of said switchgear modules including a polyphase bus and bus connection means for defining external connection points for the polyphase bus, the arrangement being characterized by arranging two or more of said switchgear modules in a predetermined relation to each other and interconnecting said bus connection means.

27. The arrangement of claim 26 wherein said bus connection means comprises means for disassembling and reassembling said switchgear modules in different combinations.

28. An arrangement to provide pressure relief for a molding housing portion having a first wall of a first predetermined thickness comprising, forming in said first wall during the molding of said housing portion a predetermined pattern of a second predetermined thickness less than said first predetermined thickness, said predetermined pattern defining a perimeter of a first area of predetermined shape and intersecting line segments that divide said first area into a predetermined array.

29. The arrangement of claim 28 wherein said first area is formed with a third predetermined thickness which is intermediate said first and second predetermined thicknesses.

30. A switchgear module for medium-voltage comprising electrical power distribution comprising:

electrical components; and means for housing and supporting said electrical components, said housing and supporting means comprising at least first and second housing portions and cooperating means for assembling said at least two housing portions in a predetermined manner to provide a gas-tight seal for a predetermined range of pressures, said first housing portion comprising means integrally molded therein for supporting said electrical components, said electrical components including means for defining connections for predetermined cable termination devices on the exterior of said first housing portion and bus conductor means within said first housing portion so as to provide external access to said bus conductor means at two predetermined locations on the exterior of said second housing portion and internal connection access points to said bus conductor means internal to said first housing portion, said first housing portion being generally closed and having a first open surface, said second housing portion interfitting with said first housing portion to close said first open surface, said second housing portion including predetermined transparent portions.

31. The switchgear module of claim 30 wherein said second housing portion is generally planar and fabricated from transparent material.

32. An arrangement for testing the integrity of a sensed voltage signal from a voltage sensor proximate a conductor of an electrical power distribution system, the arrangement comprising the provision of a test path to the voltage sensor that is independent of the path defined by the sensed voltage signal, a test voltage being applied to said independent test path such that the integrity of the path defined by the sensed voltage signal is tested.

33. A molded housing for a switchgear module for medium-voltage electrical power distribution comprising integrally molded means for supporting predetermined electrical components, means for defining electrical connection features for predetermined cable termination devices on the exterior of said molded housing, and bus conductor means integrally incorporated within said molded housing during the molding thereof so as to provide external access to said bus conductor means at two predetermined locations on the exterior of said molded housing and internal connection access points to said bus conductor means internal to said molded housing.

\* \* \* \* \*